US011133885B2

United States Patent
Andersson

(10) Patent No.: US 11,133,885 B2
(45) Date of Patent: Sep. 28, 2021

(54) METHODS AND DEVICES FOR SYNCHRONIZATION IN COMMUNICATION NETWORKS

(71) Applicant: Telefonaktiebolaget LM Ericsson (publ), Stockholm (SE)

(72) Inventor: Stefan Andersson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/608,181

(22) PCT Filed: May 12, 2017

(86) PCT No.: PCT/SE2017/050488
§ 371 (c)(1),
(2) Date: Oct. 24, 2019

(87) PCT Pub. No.: WO2018/208197
PCT Pub. Date: Nov. 15, 2018

(65) Prior Publication Data
US 2020/0169345 A1 May 28, 2020

(51) Int. Cl.
*H04J 3/06* (2006.01)
(52) U.S. Cl.
CPC .......... *H04J 3/0667* (2013.01); *H04J 3/0641* (2013.01); *H04J 3/0673* (2013.01); *H04J 3/0697* (2013.01)
(58) Field of Classification Search
None
See application file for complete search history.

(56) References Cited

U.S. PATENT DOCUMENTS

| 9,166,681 B2 * | 10/2015 | Cavaliere | H04J 14/0267 |
| 2013/0034197 A1 * | 2/2013 | Aweya | H03L 7/0991 |
| | | | 375/362 |

(Continued)

FOREIGN PATENT DOCUMENTS

EP 1703654 A1 9/2006

OTHER PUBLICATIONS

"IEEE Standard for a Precision Clock Synchronization Protocol for Networked Measurement and Control Systems," Jul. 24, 2008, 289 pages, IEEE Std 1588-2008, IEEE Instrumentation and Measurement Society.

(Continued)

*Primary Examiner* — Anh Vu H Ly
(74) *Attorney, Agent, or Firm* — Nicholson De Vos Webster & Elliott LLP

(57) ABSTRACT

A method for assisting in synchronization of slave clocks in a communication network comprises receiving, in a node of the communication network, a message comprising a value of a synchronization accuracy ($\sigma_{rec}$) of a first upstream node in the communication network. A value of an accuracy ($\sigma_{link}$) of a link latency unbalance between forward and reverse signalling in a link on which the node received the message is obtained. A value of a total synchronization accuracy ($\sigma_{tot}$) of the node comprises at least the accuracy ($\sigma_{link}$) of the link latency unbalance of the link on which the node received the message is calculated. A node for assisting in synchronization of slave clocks in a communication network is also presented.

16 Claims, 18 Drawing Sheets

(56) References Cited

U.S. PATENT DOCUMENTS

| | | | |
|---|---|---|---|
| 2014/0304543 A1* | 10/2014 | Ilyas | G06F 1/12 |
| | | | 713/401 |
| 2015/0304066 A1* | 10/2015 | Dutti | H04J 3/0647 |
| | | | 398/98 |
| 2016/0073365 A1 | 3/2016 | Klockar | |
| 2016/0094335 A1 | 3/2016 | Roberts et al. | |
| 2016/0170437 A1* | 6/2016 | Aweya | H04J 3/0667 |
| | | | 713/503 |
| 2016/0170440 A1* | 6/2016 | Aweya | H04L 69/28 |
| | | | 713/503 |
| 2016/0301589 A1* | 10/2016 | Rata | H04L 43/106 |
| 2017/0288801 A1* | 10/2017 | Aweya | H04W 56/001 |

OTHER PUBLICATIONS

International Search Report and Written Opinion for International Application No. PCT/SE2017/050488, dated Mar. 22, 2018, 15 pages.

International Preliminary Report on Patentability, PCT App. No. PCT/SE2017/050488, dated Nov. 21, 2019, 11 pages.

\* cited by examiner

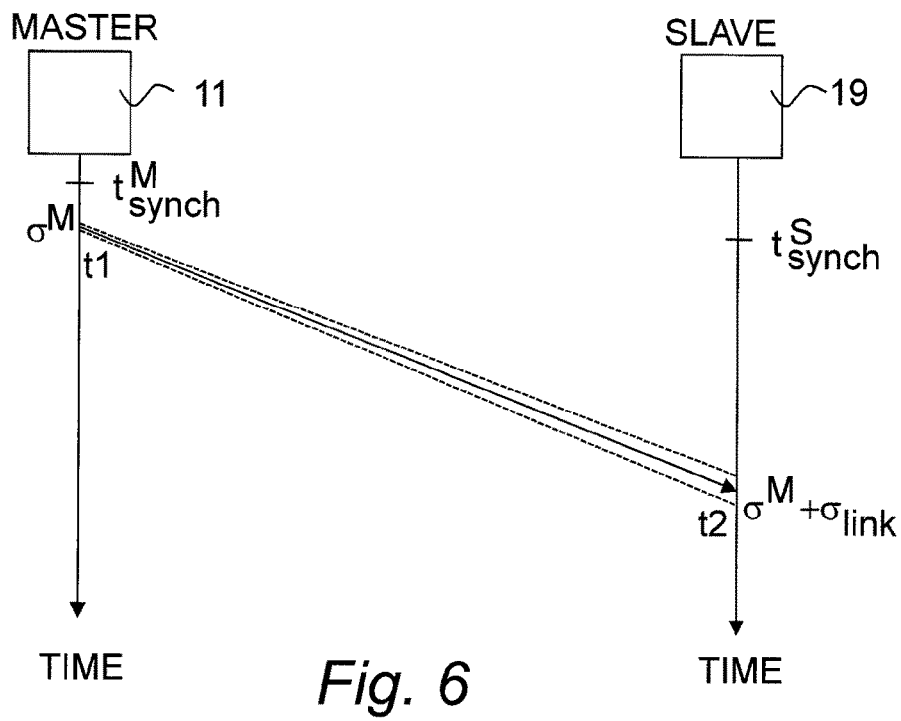
Fig. 6
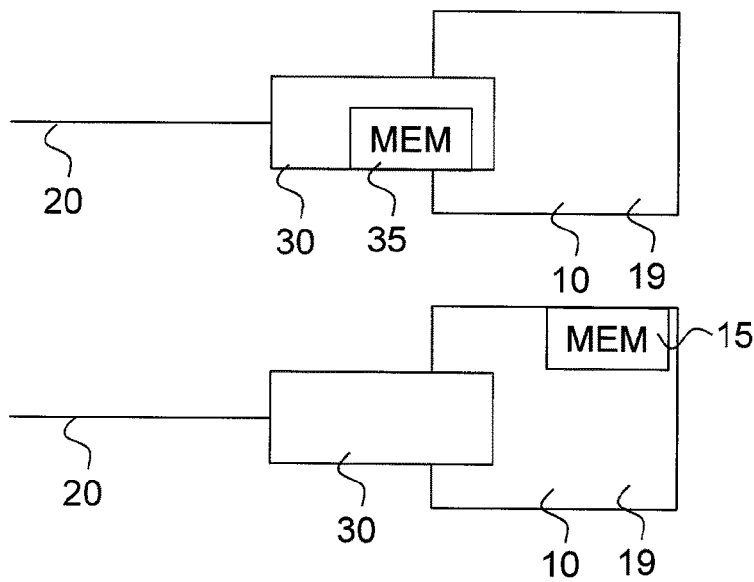
Fig. 8A
Fig. 8B
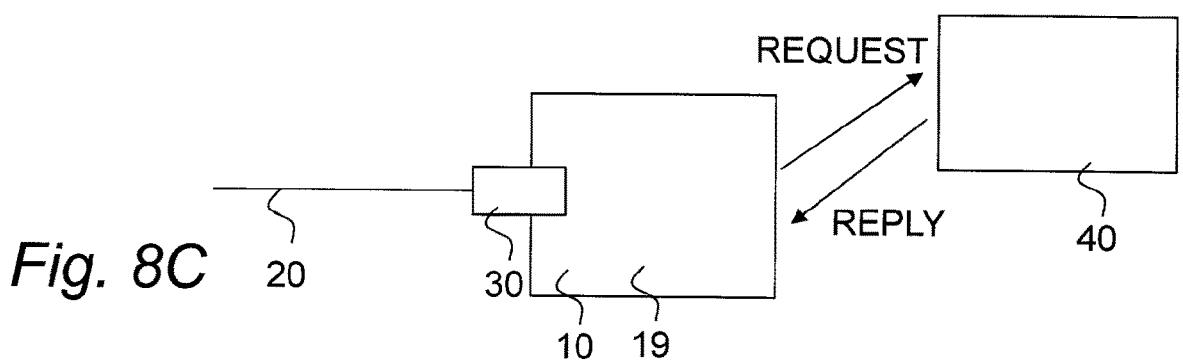
Fig. 8C

METHODS AND DEVICES FOR SYNCHRONIZATION IN COMMUNICATION NETWORKS

CROSS-REFERENCE TO RELATED APPLICATIONS

This application is a National stage of International Application No. PCT/SE2017/050488, filed May 12, 2017, which is hereby incorporated by reference.

TECHNICAL FIELD

The proposed technology generally relates to methods and devices for synchronization of slave clocks in a communication network.

BACKGROUND

In different nodes of a communication network, the time is typically defined by an internal clock. If the operations of the communication network involves any dependencies on timing, there has to be some degree of synchronization of the clocks within the communication network. The more time sensitive the operations are, the more accurate synchronization is required.

There has been considerable work performed to provide different standards for synchronization of different network nodes. In IEEE 1588 2008, see e.g. p. 1-8, a standard for a precision clock synchronization protocol for networked measurement and control systems is presented. A master-slave hierarchy is established, where a master clock provides a slave clock with information allowing the slave clock to synchronize with the master clock. The top entity of such a hierarchy is typically a grand master clock, which within a domain is the ultimate source of time for clock synchronization using the protocol. The overall quality of the synchronization is therefore dependent on the accuracy of the grand master clock, and a quality classification of the grand master clock may be reported within the domain. Thus, when performing time synchronization between units, the standard only supports presenting an accuracy of the original time server, i.e. of the grand master clock.

In the communication network, when synchronization information is signalled along different paths and passing different nodes, there is a certain loss in time synchronization accuracy due to accuracies of e.g. time stamped messages and latency unbalances. Each link and each node the time stamped message passes will contribute to a decrease in the actual total accuracy of the synchronization information.

There is a lack of estimating the time synchronization accuracy finally achieved in the time slave nodes, since there is no information presented about time synchronization accuracy loss in the path between the grand master clock and the slave. This presents a risk of selecting a poor server-path combination, resulting in poor slave time synchronization accuracy. In synchronization sensitive applications, such as Time Division Duplex (TDD) communication, this may lead to interference. This may also result in bad accuracy in network based positioning services, like Long-Term Evolution (LTE) Observed Time Difference Of Arrival (OTDOA), reduced capacity in carrier aggregation schemes, and more.

Further, with multiple available time servers through multiple paths to them, it is a challenge to select the optimum combination, resulting in the best time synchronization accuracy.

SUMMARY

It is an object to provide support for monitoring of an accuracy of the synchronization.

This and other objects are met by embodiments of the proposed technology.

According to a first aspect, there is provided a method for assisting in synchronization of slave clocks in a communication network. The method comprises receiving, in a node of the communication network, a message comprising a representation of a value of a synchronization accuracy of a first upstream node in the communication network. A value of an accuracy of a link latency unbalance between forward and reverse signalling in a link on which the node received the message is obtained. A value of a total synchronization accuracy of the node is calculated comprising at least the accuracy of the link latency unbalance of the link on which the node received the message.

According to a second aspect, there is provided a method for synchronization of slave clocks in a communication network, in a node comprising a slave clock. The method comprises performing of a method for assisting in synchronization of nodes in a communication network according to the first aspect. The slave clock of the node is adjusted to compensate for a prevailing latency unbalance. This prevailing latency unbalance (A) is either the value of the total latency unbalance or the link latency unbalance between forward and reverse signalling in the link on which the node received the message.

According to a third aspect, there is provided a method for assisting in synchronization of nodes in a communication network. The method comprises transmitting, from a node comprising a grand master clock, a message comprising a representation of a value of a synchronization accuracy of the grand master clock.

According to a fourth aspect, there is provided a node in a communication network. The node is configured to receive a message comprising a representation of a value of a synchronization accuracy of a first upstream node in the communication network. The node is configured to obtain a value of an accuracy of a link latency unbalance between forward and reverse signalling in a link on which the node received the message. The node is configured to calculate a value of a total synchronization accuracy of the node comprising at least the accuracy of the link latency unbalance of the link.

According to a fifth aspect, there is provided a node in a communication network. The node is configured to transmit a message comprising a representation of a value of a synchronization accuracy of a grand master clock comprised in the node.

According to a sixth aspect, there is provided a computer program. The computer program comprises instructions, which when executed by at least one processor, cause the processor(s) to receive a message comprising a representation of a value of a synchronization accuracy of a first upstream node in the communication network. The instructions, when executed by the processor(s), further cause the processor(s) to obtain a value of an accuracy of a link latency unbalance between forward and reverse signalling in a link on which the message was received. The instructions, when executed by the processor(s), further cause the processor(s) to calculate a value of a total synchronization accuracy of the node comprising at least the accuracy of the link latency unbalance of the link.

According to a seventh aspect, there is provided a computer program comprising instructions, which when executed by at least one processor, cause the processor(s) to transmit a message comprising a representation of a value of a synchronization accuracy of a grand master clock comprised in a same node as comprising the processor(s).

According to an eighth aspect, there is provided a computer-program product comprising a computer-readable medium having stored thereon a computer program of the sixth and/or seventh aspect.

According to a ninth aspect, there is provided a carrier comprising the computer program of the sixth and/or seventh aspect. The carrier is one of an electronic signal, an optical signal, an electromagnetic signal, a magnetic signal, an electric signal, a radio signal, a microwave signal, or a computer-readable storage medium.

According to a tenth aspect, there is provided a connector of a communication link. The connector comprises a memory comprising information associated with a value of an accuracy of a link latency unbalance between forward and reverse signalling in the link. The memory is retrievable by a node to which the connector is connected.

According to an eleventh aspect, there is provided a node in a communication network. The node comprises a receiver, for receiving a message comprising a representation of a value of a synchronization accuracy of a first upstream node in the communication network. The node further comprises an obtaining module, for obtaining a value of an accuracy of a link latency unbalance between forward and reverse signalling in a link on which the node received the message. The node further comprises a calculator, connected to the receiver and the obtaining module, for calculating a value of a total synchronization accuracy of the node comprising at least the accuracy of the link latency unbalance of the link on which the node received the message.

According to a twelfth aspect, there is provided a node in a communication network comprising a grand master clock and a transmitter for transmitting a message comprising a representation of a value of a synchronization accuracy of the grand master clock.

An advantage of the proposed technology is that with a possibility of accurately estimate the available possible accuracy for combination of time servers and synchronization paths, the slave time synchronization accuracy can be both optimized and estimated.

TDD interference can then be prevented, positional accuracy may be both minimized and estimated, and carrier aggregation capacity optimized and more. Other advantages include network stability and capacity.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which:

FIG. 6 is a schematic illustration of a development of inaccuracy of synchronization;

FIGS. 8A-C are schematic illustrations of different embodiments for obtaining a value of an accuracy of a link latency unbalance between forward and reverse signalling;

DETAILED DESCRIPTION

Throughout the drawings, the same reference designations are used for similar or corresponding elements.

For a better understanding of the proposed technology, it may be useful to begin with a brief overview of communication networks and synchronization therein.

Figure 1:
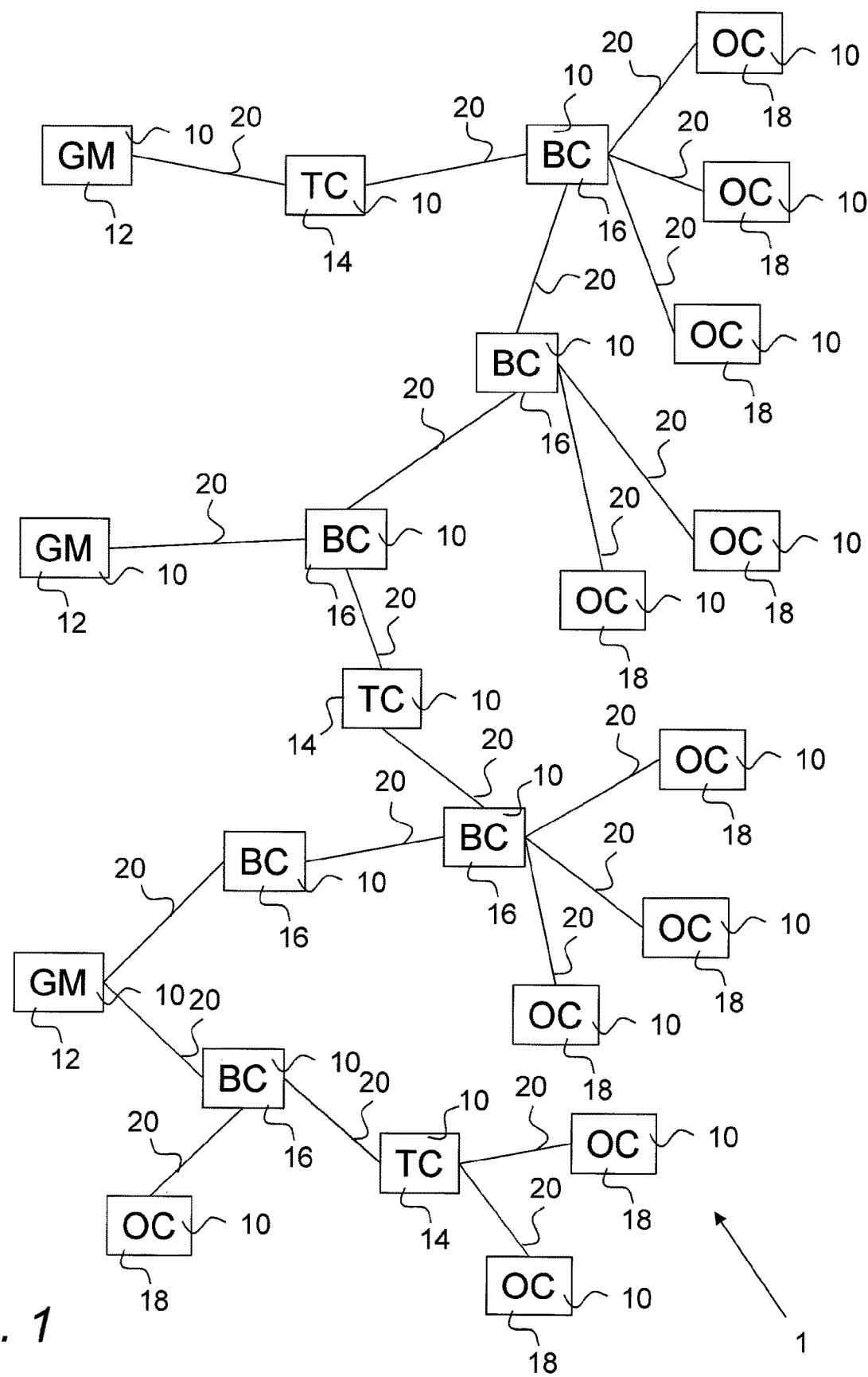
FIG. 1 is a schematic illustration of a communication network.

FIG. 1 illustrates an example of a communication network 1 comprising a number of nodes 10 connected by links 20 over which the nodes 10 can communicate. Some nodes 10 comprises a grand master (GM) clock 12, which constitutes the ultimate source of time for clock synchronization within a domain. The grand master clock 12 is typically a high-precision clock and is typically classified according to certain precision standard classes. The GM 12 communicates with other nodes 10 of the communication network 1 to enable synchronization with the grand master clock 12. The grand master clock GM operates as a master and the other node operates as a slave. A node comprising an ordinary clock (OC) 18 is configured to allow for synchronization, i.e. its clock is configured to operate as a slave. A node 10 comprising a boundary clock (BC) 16 is also configured to allow for synchronization, i.e. its clock is also configured to operate as a slave. However, the clock of the BC 16 may also operate as a master, giving synchronization support to further nodes, e.g. OCs 18 or other BCs 16. A node 10 comprising a transparent clock (TC) 14 is in itself not synchronizing to the grand master 12. It is instead configured to just forward any synchronization messages to and from the GM 12 to BCs 16 or OCs. However, since the impact of the TC 14 on the message timing typically gives rise to a delay, the TC 14 informs the BC 16 or OC 18 downstream about this delay.

Communication networks 1 of today are often interconnected or nestled, which may give different nodes possibilities to synchronize using different grand master clocks. It is e.g. possible for a node to select a GM with a highest accuracy classification. However, such choices can in prior art not easily take any accuracy properties of intermediate links and nodes into account.

Figure 2A:
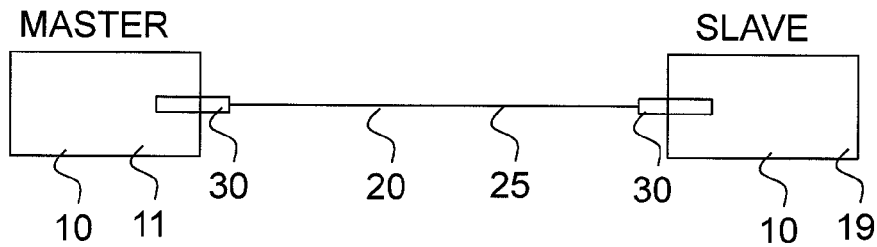
FIGS. 2A-C are schematic illustrations of the connection of a node with a master clock and a node with a slave clock.

FIG. 2A illustrates two nodes 10, a node operating as a master 11 and node operating as a slave 19, concerning synchronization matters. The master 11 and the slave 19 are interconnected by a link 20 on which they can communicate. In this embodiment, the link 20 is an optical link 25. The link is connected to each node 10 by means of a respective connector 30. Such a connected can be of any type. Some non-exclusive typical examples are SFP, SFP+, XFP or QSFP modules.

Figure 2B:
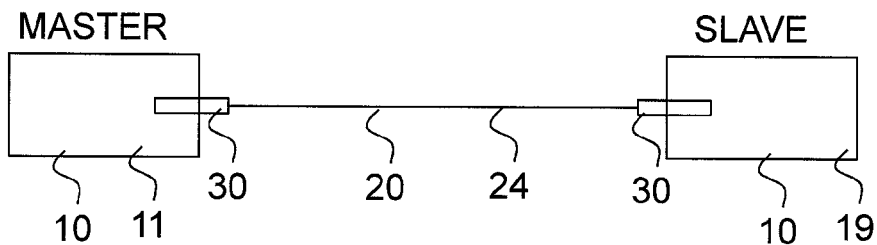

FIG. 2B illustrates another embodiment, where the master 11 and the slave 19 are connected by an electrical link 24, i.e. the connection between the nodes is a wired connection based on conductive transmission of electrical signals.

Figure 2C:
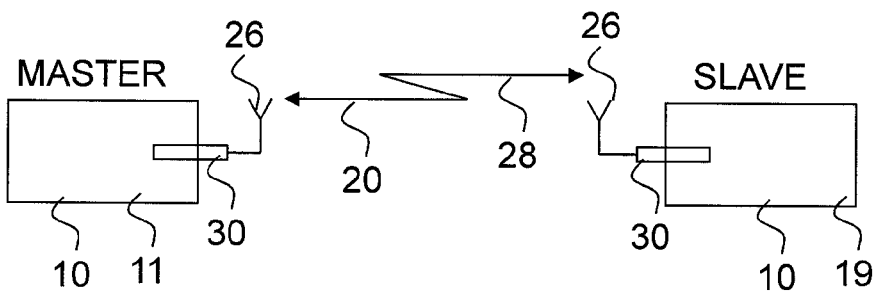

FIG. 2C illustrates yet another embodiment, where the link 20 comprises a radio link 28. Antennas 26 on each sides are connected by the connectors 30 to a respective node 10.

Anyone skilled in the art realizes that a communication network may be composed by links of different kinds in different places.

Figure 3:
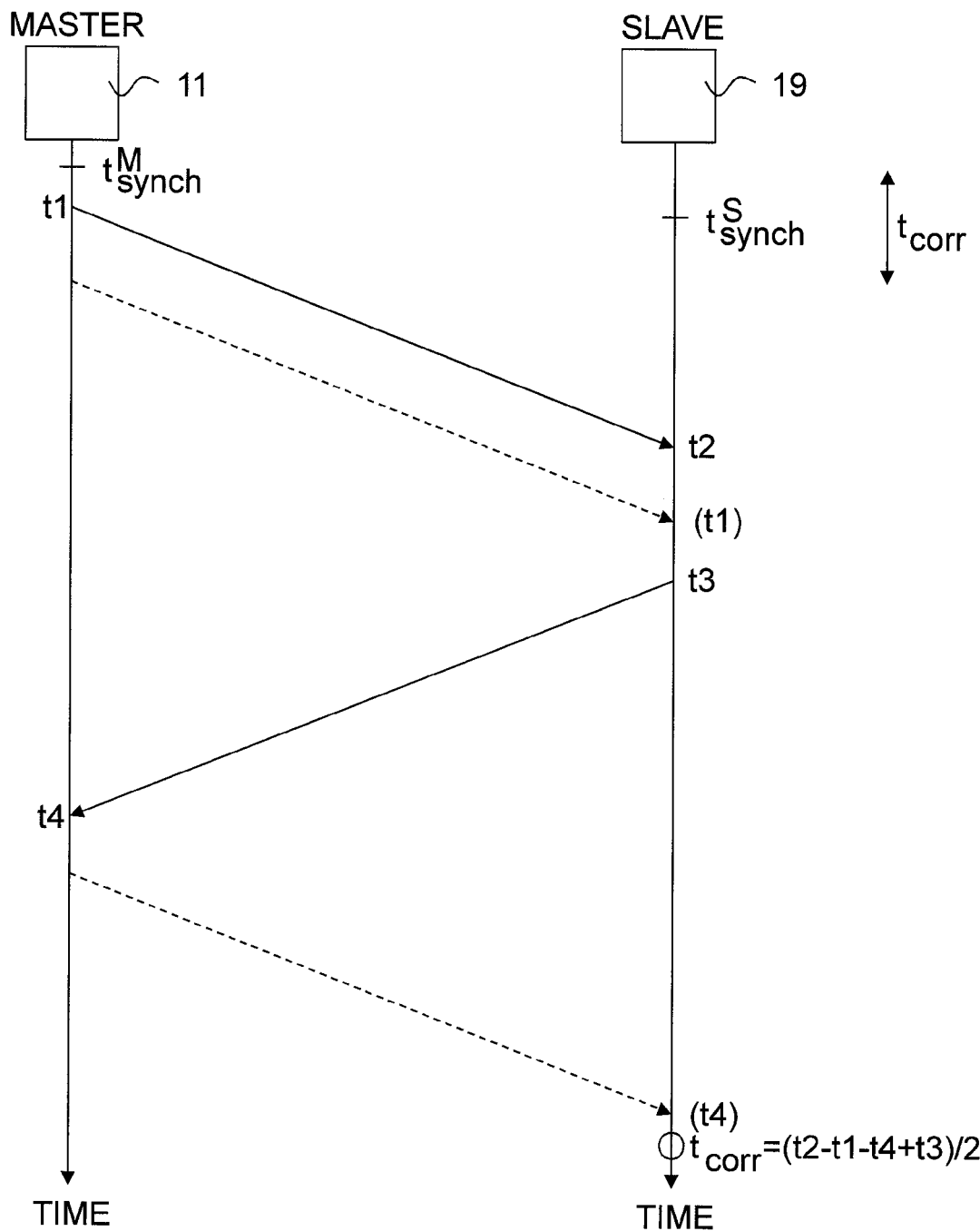
FIG. 3 is a schematic illustration of a synchronization procedure between a master clock and a slave clock.

A typical procedure for performing a synchronization of a slave clock is illustrated schematically in FIG. 3. This corresponds essentially to what is specified in IEEE 1588 2008, FIG. 12, page 34. A master 11, having a time synchronization based on a time $t_{synch}^M$, sends a synchronization message at time t1 to a slave 19. The slave 19 receives the synchronization message at time t2, with reference to the time synchronization based on a time $t_{synch}^S$. The master 11 conveys the timestamp t1 to the slave 19, either in the synchronization message itself or, as illustrated, in a follow-up message. The slave 19 receives the time stamp t1. The slave 19 replies by sending a reply message to the master 11 and notes the time t3. The master 11 receives the reply message and notes the reception time t4. The master 11 sends the time t4 to the slave 19 in a follow-up message. When the slave 19 has received the time t4, a correction of the slave synchronization time $t_{synch}^S$ is made by the algebraic expression $t_{corr}=(t2-t1-t4+t3)/2$. The updated time of the slave clock is set to $t_{synch}^S-t_{corr}$.

Figure 4:
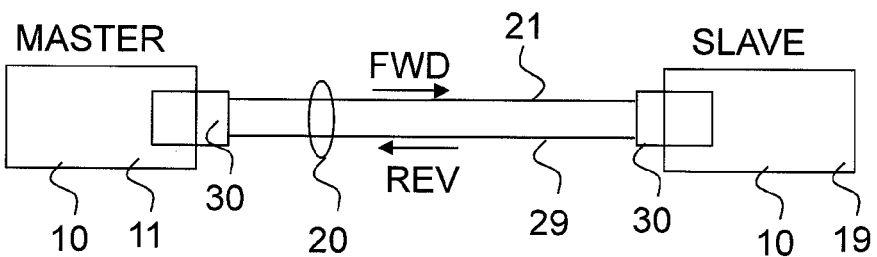
FIG. 4 is a schematic illustration of the forward and reverse signaling aspect of a link between a master clock and slave clock.
Figure 5:
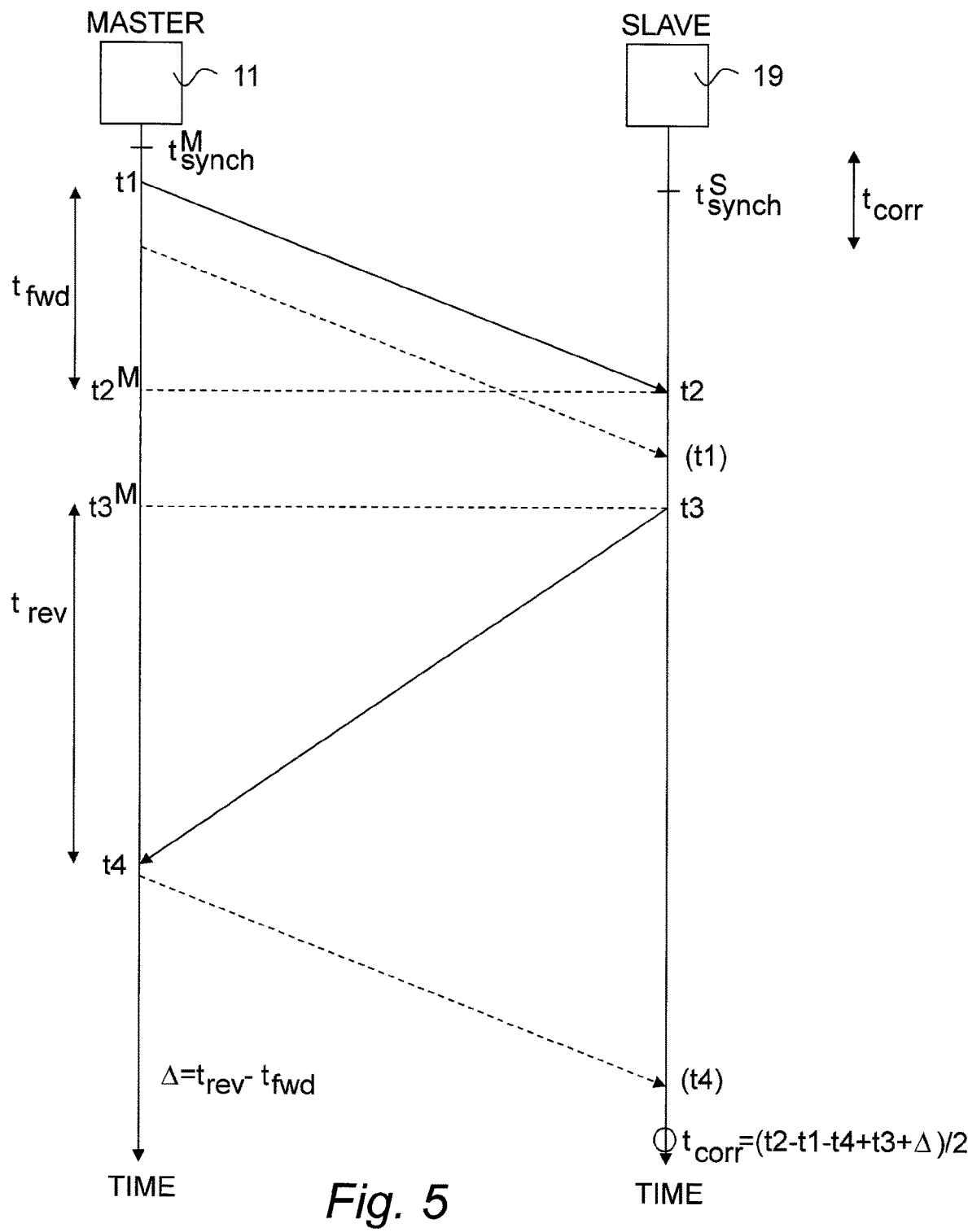
FIG. 5 is a schematic illustration of a synchronization procedure between a master clock and a slave clock with a link having an unbalance of forward and reverse signaling.

A link has in most cases two directions of communication. One may then, as illustrated in FIG. 4, define the link 20 to comprise a forward link 21 and a reverse link 29. In cases where the communication properties of these two directions are exactly the same, no further considerations have to be made. However, if the communication properties, such as link transition time, code internal transition time or any other reception overhead time, is different for the different directions, additional considerations may be preferable. One example is illustrated in FIG. 5, concerning the synchronization. In this example, the transmitting time $t_{fwd}$ in the forward direction is shorter than the transmitting time $t_{rev}$ in the reverse direction. If not taking this effect into account, the procedure according to FIG. 3 will result in an offset in the slave synchronization $t_{synch}^S$ of $\Delta/2$ where $\Delta=t_{rev}-t_{fwd}$. Therefore, with knowledge of the differences between the different link directions, i.e. a link latency unbalance, a compensation for the link latency unbalance can and should be made in order to reach a correct synchronization. The same procedure is valid for other latency unbalances within the system.

Besides direction unbalances, synchronization is also associated with a particular accuracy. In prior art, the grand master clock may inform its slave nodes about which class of accuracy it belongs to. Such a classification is a relatively coarse measure of the actual uncertainty of the synchronization. Furthermore, there are presently no simple possibilities to analyse the effect of additional accuracy deterioration along different signalling paths. A high-precision grand master clock being available far away in a network may even provide a worse synchronization accuracy than a low-precision grand master clock in the neighbourhood due to inaccuracies along the paths.

FIG. 6 illustrates this problem in a schematic manner. The master clock 11 sends a message at a time t1. According to the classification of the master clock 11, a certain accuracy $\sigma^M$ is associated with the time stamping t1. Such a measure can be of different kinds, e.g. a classification, a measure based on standard deviation or variance, a "worst case" interval etc. This is discussed more in detail further below. The message is received by the slave clock 19 at time t2. The accuracy of this time t2 depends on the accuracy of the slave node time stamping circuitry. The complete time accuracy achieved in the slave is given by the accuracy of t1, t2, t3, t4 and $\Delta$ (c.f. FIG. 5).

With information about time synchronization accuracy reduction for each element in the path, e.g. cables and TCs, between a master clock and a slave clock available, plus information about the original accuracy of the master clock, as well as the slaves own time synchronization accuracy capability, the slave can estimate its own resulting time synchronization accuracy.

The synchronization accuracy information from the master clock could in one embodiment be included in the time synchronization messages from the master clock. This could be following for example the IEEE 1588 v2 standard. Preferably, the synchronization accuracy is not only given as a coarse classification, but in terms of measures, e.g. based on a standard deviation and worst case interval.

Information about latency unbalance and time synchronization accuracy reduction, i.e. accuracy of latency unbalance information, for cables in the path between the master and the slave could be provided as data stored in a memory within the network, since it typically is constant for a certain configuration of links. Such information may therefore be provided upon installation of the links and nodes. Different possible examples are discussed further below. When requested, such stored data can be retrieved and used for adjusting a total time synchronization and time synchronization accuracy estimation.

Preferably, information about time synchronization accuracy reduction for a TC unit in the path, should also be taken into account. Such information can in one embodiment be added e.g. to a synchronization correction message issued by the TC, e.g. as a modification of the present standards.

Preferably, each TC should also utilize the information provided by the cable or other link mounted between itself and in the direction towards the master clock, i.e. upstream, and adjust its synchronization correction message accordingly to also include the effects of the link latency unbalance- and/or link latency unbalance accuracy.

In such a way, each slave clock, e.g. comprised in a BC or an OC, could correct its synchronized time setting and time accuracy estimation, utilizing the information from synchronization messages received from the direction, i.e. upstream, towards the master clock. These may originate from the GM, or the first BC in the path towards the GM. Also the information of the cable or other link mounted or utilized in the upstream direction can be utilized.

In the case of a BC, the calculated total inaccuracy should then be included in its outgoing synchronization messages downstream to other slave units, BC or OC, further away from the grand master clock.

In a non-preferred alternative, one could choose to include the cable accuracy information in the opposite order instead, where the GM include effect from cable information in synchronization messages. However, the implementation is expected to be more complicated without any foreseen benefits.

An approach according to one embodiment of the above ideas provides information about a TC effect on time synchronization accuracy in synchronization messages from the TC. A time slave unit, i.e. a BC or OC, can utilize this information, together with accuracy information in synchronization messages from the master clock, i.e. a GM or the first BC in the path upstream, and information about its own time synchronization capability, to optimize and estimate its own slave time accuracy. This accuracy information can then be included in its own synchronization messages downstream.

Figure 7:
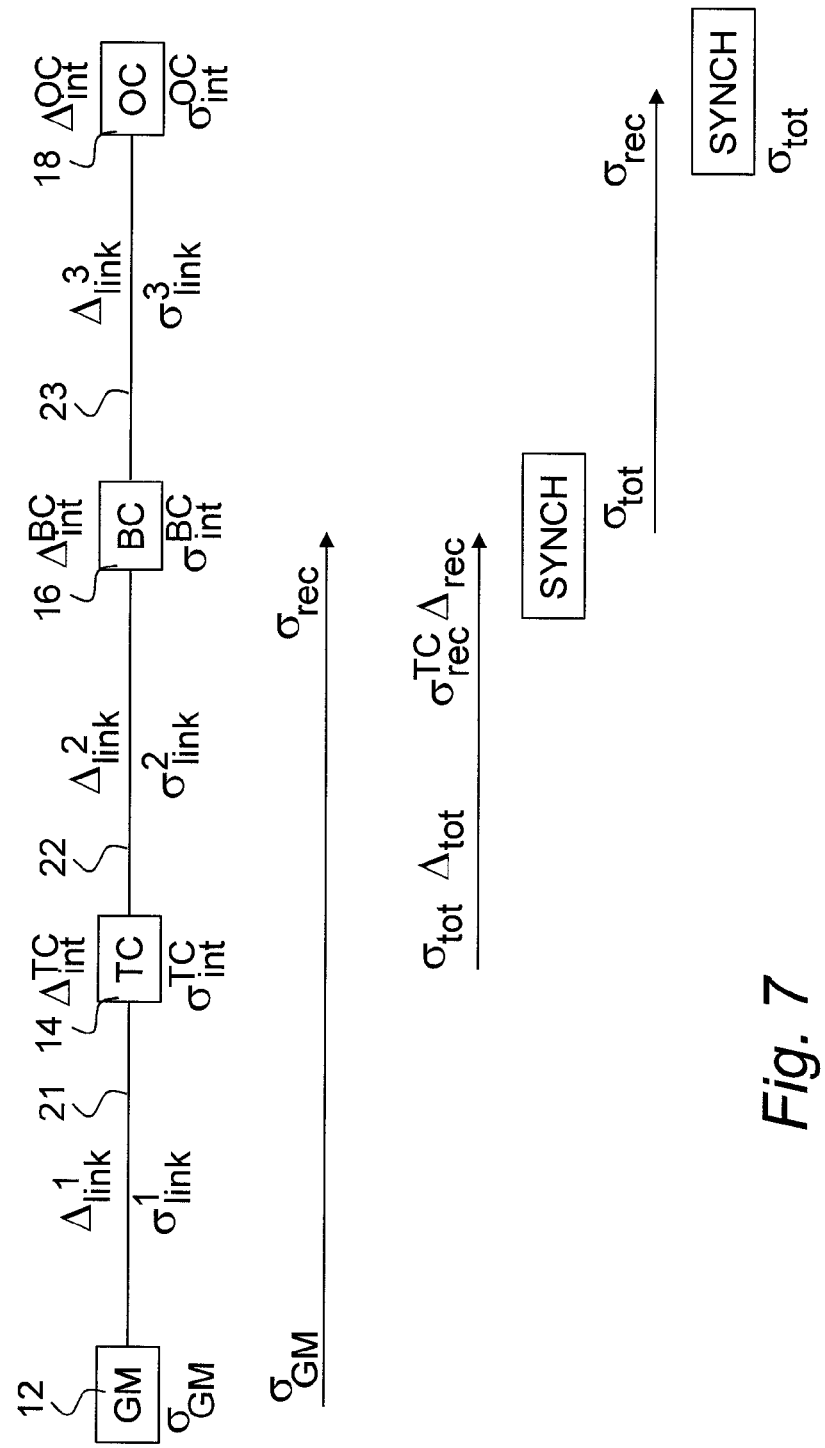
FIG. 7 is a schematic illustration of an embodiment of signaling in a method for assisting in synchronization of slave clocks in a communication network.

FIG. 7 illustrates a schematic situation in an embodiment of the technology presented here. A model path is used, where GM 12 provides the original synchronization time. The GM 12 is associated with a certain accuracy $\sigma_{GM}$. A first link 21 connects a TC 14 to the GM 12. This link 21 has a certain link latency unbalance $\Delta_{link}^1$ between forward and reverse signalling in the link and an accuracy $\sigma_{link}^1$ of the link latency unbalance representation. The TC 14 likewise has certain internal latencies in forward and reverse direction, giving an internal latency unbalance $\Delta_{int}^{TC}$ between forward and reverse signalling and an internal synchronization accuracy $\sigma_{int}^{TC}$, including the accuracy of the internal latency unbalance representation. A second link 22 connects a BC 16 to the TC 14. This second link 22 has a certain link latency unbalance $\Delta_{link}^2$ between forward and reverse signalling in the link 22 and an accuracy $\sigma_{link}^2$ of the link latency unbalance representation. The BC 16 likewise has a certain internal latency unbalance $\Delta_{int}^{BC}$ between forward and reverse signalling and an internal synchronization time stamping and latency unbalance accuracy, resulting in an internal synchronization accuracy $\sigma_{int}^{BC}$ contribution. A third link 23 connects an OC 18 to the BC 16. This third link 23 has a certain link latency unbalance $\Delta_{link}^3$ between forward and reverse signalling in the link 23 and an accuracy $\sigma_{link}^3$ of the link latency unbalance representation. The OC 18 likewise has a certain internal latency unbalance $\Delta_{int}^{OC}$ between forward and reverse signalling and an internal synchronization time stamping and latency unbalance accuracy, resulting in an internal synchronization accuracy $\sigma_{int}^{OC}$ contribution.

The GM 12 sends a synchronization message to the BC 16. The GM 12 includes a measure of the accuracy $\sigma_{GM}$ in this message. The synchronization message passes the TC 14. In other words, the TC 14 forwards the message received from the GM to the BC 16. This causes a certain time delay, which is reported by the TC 14 to the BC 16. In this embodiment, the TC 14 obtains a value of the accuracy $\sigma_{link}^1$ of the link latency unbalance between forward and reverse signalling in the first link 21, i.e. the link on which the TC 14 node received the message comprising the accuracy $\sigma_{GM}$. How this link accuracy value is obtained is discussed more in detail further below. The TC 14 further obtains its internal synchronization accuracy $\sigma_{int}^{TC}$ and combines it with the link accuracy $\sigma_{link}^1$ into a value of a total synchronization accuracy $\sigma_{tot}$ of the TC 14 node, comprising e.g. the contribution from the first link. Moreover, in this embodiment, the TC 14 also obtains a value of the link latency unbalance $\Delta_{link}^1$ between forward and reverse signalling in the first link 21, i.e. the link on which the TC 14 node received the message comprising the accuracy $\sigma_{GM}$. The TC 14 further obtains its internal latency unbalance $\Delta_{int}^{TC}$ and sums it to the link latency unbalance $\Delta_{link}^1$ into a value of a total latency unbalance $\Delta_{tot}$ of the TC 14 node, comprising e.g. the contribution from the TC and the first link. These values of a total synchronization accuracy $\sigma_{tot}$ and a total latency unbalance $\Delta_{tot}$ of the TC 14 node, comprising e.g. the contribution from the TC and the first link are provided in a message to the BC 16, preferably together with the information about the time delay in the TC 14.

The BC 16 receives the synchronization message, and the accuracy measure, denoted as $\sigma_{rec}$ in the BC 16. The BC 16 also receives the information about the time delay in the TC 14 and also about the total synchronization accuracy $\sigma_{tot}$ and the total latency unbalance $\Delta_{tot}$ of the TC 14 node, denoted as $\sigma_{rec}^{TC}$ and $\Delta_{rec}$, respectively, in the BC 16. In this embodiment, the BC 16 obtains a value of the accuracy $\sigma_{link}^2$ of the link latency unbalance between forward and reverse signalling in the second link 22, i.e. the link on which the BC 16 node received the message comprising the accuracy $\sigma_{rec}$. The BC 16 further obtains its internal synchronization accuracy $\sigma_{int}^{BC}$. The BC calculates a value of a total synchronization accuracy $\sigma_{tot}$ associated with its own BC 16 node. This calculation is in this embodiment a combination of the link accuracy a $\sigma_{link}^2$, the internal synchronization accuracy $\sigma_{int}^{BC}$, the received accuracy measure from the master clock $\sigma_{rec}$ and the total synchronization accuracy $\sigma_{rec}^{TC}$ of the TC. Moreover, in this embodiment, the BC 16 also obtains a value of the link latency unbalance $\Delta_{link}^2$ between forward and reverse signalling in the second link 22, i.e. the link on which the BC 16 node received the message comprising the accuracy $\sigma_{rec}$. The BC 16 further obtains its internal latency unbalance $\Delta_{int}^{BC}$. The BC 16 sums the internal latency unbalance $\Delta_{int}^{BC}$, the link latency unbalance $\Delta_{link}^2$ and the received total latency unbalance $\Delta_{rec}$ associated with the TC into a value of a total latency unbalance $\Delta_{tot}$ of the BC 16 node.

In the present embodiment, the BC 16 utilizes the computed total latency unbalance $\Delta_{tot}$ in the synchronization process to compensate for all unbalances occurring between the master clock and the BC 16. The slave clock of the BC 16 is then synchronized with the master clock of the GM 12.

This synchronization has an accuracy corresponding to the total synchronization accuracy $\sigma_{tot}$.

The BC 16 has a slave clock in relation to the master clock of GM 12. However, since it is a BC, the clock of the BC 16 is also a master clock with respect to nodes downstream, in this example with respect to the OC 18. The BC 16 therefore sends a synchronization message to the OC 18. The BC 16 also sends information about the total synchronization accuracy $\sigma_{tot}$, in one embodiment incorporated in the synchronization message itself.

The OC 18 receives the synchronization message, and the accuracy measure, denoted as $\sigma_{rec}$ in the OC 18. In this embodiment, the OC 18 obtains a value of the accuracy $\sigma_{link}^3$ of the link latency unbalance between forward and reverse signalling in the third link 23, i.e. the link on which the OC 18 node received the message comprising the accuracy $\sigma_{rec}$. The OC 18 further obtains its internal synchronization accuracy a $\sigma_{int}^{OC}$. The OC 18 calculates a value of a total synchronization accuracy $\sigma_{tot}$ associated with its own OC 18 node. This calculation is in this embodiment a combination of the link accuracy $\sigma_{link}^3$, the internal synchronization accuracy $\sigma_{int}^{OC}$ and the received accuracy measure from the master clock, in this case a boundary clock, $\sigma_{rec}$. Moreover, in this embodiment, the OC 18 also obtains a value of the link latency unbalance $\Delta_{link}^3$ between forward and reverse signalling in the third link 23, i.e. the link on which the OC 18 node received the message comprising the accuracy $\sigma_{rec}$. The OC 18 further obtains its internal latency unbalance $\Delta_{int}^{OC}$. The OC 16 sums the internal latency unbalance $\Delta_{int}^{OC}$ and the link latency unbalance $\Delta_{link}^3$ into a value of a total latency unbalance $\Delta_{tot}$ of the OC 18 node.

In the present embodiment, the OC 18 utilizes the computed total latency unbalance $\Delta_{tot}$ in the synchronization process to compensate for all unbalances occurring between the boundary clock of the BC 16 and the OC 18. The slave clock of the OC 18 is then synchronized with the boundary clock of the BC 16, which in turn is synchronized with the GM 12. This synchronization has an accuracy corresponding to the total synchronization accuracy $\sigma t_{tot}$.

Such an approach will give the final node OC 18 information about the actual accuracy of its synchronization, where all contributions to the inaccuracy from links and nodes in the path are considered. This gives valuable information about the possibilities for synchronization-sensitive applications, such as TDD or positioning procedures.

One part of the above presented approach is the availability of information about an accuracy of a link latency unbalance between forward and reverse signalling in a link. Preferably, also the absolute value of the link latency unbalance is used for synchronization purposes. The properties of a link, e.g. a cable, are typically constant with time, i.e. once a link is installed and configured it presents the same properties for all future time. This opens up for providing information before, during or soon after installation that comprises information of interest.

One attractive possibility is schematically illustrated in FIG. 8A. The link 20 ends with a connector 30, which is plugged into the node 10, comprising a slave clock 19. Cable connectors 30 of today often has possibilities to additionally handling limited processing and/or data storing capacities. In this embodiment, the connector 30 is provided with a memory 35, in which data concerning an accuracy of a link latency unbalance and/or a link latency unbalance is stored. In other words, in this embodiment, at least one memory 35, e.g. a read-only memory, is located in the connector 30 at the end of the link 20 or cable, furthest away from the master clock. In this memory, the manufacturer or the installer has loaded relevant information, which can be retrieved upon request from the node to which it is connected. Preferably, two read-only memories are located in respective ends of the cable. This eliminates a need to attach the cable in a specific direction, or transferring the information to the other end. As mentioned above, this time synchronization information for the cable typically consist of information about latency unbalance for forward vs. reverse direction, and an estimate of the accuracy in this information. The information may be provided divided per link latency, preferably plus information for zero-length, eliminating a need for different values for different link lengths. Information about a cables effect on time synchronization accuracy can thus be provided with the cable itself. It may even be provided a long time before the cable even is installed, which opens up for the manufacturer to keep control over the available information, and an installer does not even have to know about these possibilities.

In other words, obtaining a value of an accuracy of a link latency unbalance comprises retrieving information associated with the value of the accuracy of the link latency unbalance from a memory in a connection of the link on which the node received the message concerning an accuracy measure from the master clock.

An analogue procedure can be used also for achieving information of the link latency unbalance itself. Obtaining of a value of a link latency unbalance may comprise retrieving of information associated with the value of the link latency unbalance from a memory in a connection to the link on which the node received the message concerning an accuracy measure from the master clock.

FIG. 8B illustrates schematically another embodiment, in which the synchronization information for the link is provided in a memory 15 of the node 10. The information in the memory can be stored in connection with the installation of the link. Such information storage can be made by an installer or may be a part of an automatic installation procedure, where appropriate information is stored into the memory 15. In other words, obtaining of a value of an accuracy of a link latency unbalance comprises retrieving information associated with the value of said accuracy of the link latency unbalance from a memory of the node.

An analogue procedure can be used also for achieving information of the link latency unbalance itself. Obtaining a value of a link latency unbalance may comprise retrieving of information associated with the value of the link latency unbalance from a memory of the node.

FIG. 8C presents yet another embodiment. In this embodiment, the relevant synchronization information for the link is available in a synchronization support node 40 of the communication network. This synchronization support node 40 can be placed anywhere in or connected to the network, e.g. as a cloud application. The synchronization support node 40 has data concerning different model types of links that often are used within communication networks. The node 10 sends a request for a value of an accuracy of a link latency unbalance to the synchronization support node 40 comprising e.g. a model type of the link. The synchronization support node 40 checks in its data base for the model type and retrieves suitable information connected to that model type. As will be described further below, the information may be provided in absolute numbers or as relative measures. The information is replied back to the node 10, to assist in the calculations of accuracy of synchronization.

Alternatively, the synchronization support node 40 may even have more specific data concerning the link in question.

If data specifying the accuracy of a link latency unbalance are supplied to the synchronization support node upon installation of the link together with an identity of that specific link, the request for a value of an accuracy of a link latency unbalance may simply comprise the link identity. The synchronization support node 40 may then use the link identity to identify the suitable information and send this information back to the node 10.

In other words, obtaining a value of an accuracy of a link latency unbalance comprises a transmitting of a request and a receiving of information. The transmitting of a request comprises transmitting of a request for a value of an accuracy of a link latency unbalance to a synchronization support node of the communication network. The request comprises information of an identity and/or model type of the link on which the node received the message concerning an accuracy measure from the master clock. The reception of information comprises receiving of information associated with the value of the accuracy of the link latency unbalance from the synchronization support node.

An analogue procedure can be used also for achieving information of the link latency unbalance itself. Obtaining a value of a link latency unbalance comprises a transmitting of a request and a receiving of information. The transmitting of a request comprises transmitting a request for a value of a link latency unbalance to a synchronization support node of the communication network. The request comprises information of an identity and/or model type of the link on which the node received the message concerning an accuracy measure from the master clock. The reception of information comprises receiving of information associated with the value of the link latency unbalance from the synchronization support node.

The data may in one embodiment be expressed as link latency unbalance and accuracy of link latency unbalance, respectively, per cable latency unit. The data may in an alternative embodiment be expressed per length unit, if information about transmission speed also is included. In yet another embodiment, a worst case maximum latency unbalance number and corresponding accuracy measure can be specified, in particular for cables lacking adequate detailed information about this proposed information.

Similarly, synchronization accuracies of other parts of the paths can be expressed in similar terms.

The accuracy measure of a link, a node or a previous master clock or transparent clock is in one embodiment a measure derivable from a standard deviation for the corresponding inaccuracy. The calculation of a total accuracy of a node will in such an embodiment typically comprise a combination of accuracy measures in a quadratic manner. Expressed differently, the square of the total accuracy standard deviation becomes equal to the sum of the squares of the accuracy standard deviations of the parts to be combined.

The accuracy measure of a link, a node or a previous master clock or transparent clock is in one embodiment a measure of an interval of a worst case scenario of the corresponding inaccuracy. In such an embodiment, the calculation of a total accuracy of a node will typically comprise an addition of worst case interval measures into a total measure.

In one embodiment, more than one type of accuracy measure can be provided, e.g. both a standard deviation and a worst case interval.

In other words, the values of the synchronization accuracy of an upstream node and the accuracy of a link latency unbalance of the link on which a node received a synchronization accuracy message, the total synchronization accuracy of the node, and/or the internal synchronization accuracy of the node, if any, are expressed in terms of at least one of a representation of accuracy standard deviation and a representation of a worst case accuracy interval, of respective accuracies.

The accuracies and/or unbalances can be provided in different shapes. In one embodiment, the information associated with the value of said accuracy of the link latency unbalance comprises an absolute value of the accuracy of the link latency unbalance.

In one embodiment, the information associated with the value of the accuracy of the link latency unbalance comprises a specific value of an accuracy of the link latency unbalance expressed as an accuracy per unit length of the link or an accuracy per unit transmission time of the link. The obtaining of a value of an accuracy of a link latency unbalance thereby further comprises deriving an absolute value of the accuracy of the link latency unbalance based on the specific value of the accuracy of the link latency unbalance. In other words, by multiplying a value of an accuracy per unit length with the actual length of the link, an absolute value can be achieved. Likewise, by multiplying a value of an accuracy per unit transmission time with the actual transmission time of the link, an absolute value can be achieved.

Analogously, in one embodiment, the information associated with the value of said link latency unbalance comprises an absolute value of the link latency unbalance.

In one embodiment, the information associated with the value of the link latency unbalance comprises a specific value of the link latency unbalance expressed as a link latency unbalance per unit length of the link or a link latency unbalance per unit transmission time of the link. The obtaining of a value of a link latency unbalance thereby further comprises deriving an absolute value of the link latency unbalance based on the specific value of link latency unbalance. In other words, by multiplying a value of an accuracy per unit length with the actual length of the link, an absolute value can be achieved. Likewise, by multiplying a value of an accuracy per unit transmission time with the actual transmission time of the link, an absolute value can be achieved.

In one aspect of the presented technology, a connector of a communication link comprises a memory. The memory comprises information associated with the value of an accuracy of a link latency unbalance between forward and reverse signalling in the link. The memory is retrievable by a node to which the connector is connected.

In one embodiment, the information associated with the value of the accuracy of the link latency unbalance comprises an absolute value of the accuracy of the link latency unbalance.

In one embodiment, the information associated with the value of the accuracy of the link latency unbalance comprises a specific value of synchronization accuracy expressed as an accuracy of the link latency unbalance per unit length of the link or an accuracy of the link latency unbalance per unit transmission time of the link.

In one embodiment, the memory further comprises information associated with a value of the link latency unbalance between forward and reverse signalling in the link.

In one further embodiment, the information associated with the value of the link latency unbalance comprises an absolute value of the link latency unbalance.

In another further embodiment, the information associated with the value of the link latency unbalance comprises a specific value of the link latency unbalance expressed as a link latency unbalance per unit length of the link or a link latency unbalance per unit transmission time of the link.

In one embodiment, the link is an optical fibre link.
In one embodiment, the link is an electrical wire link.
In one embodiment, the link is a radio link.

Figure 9:
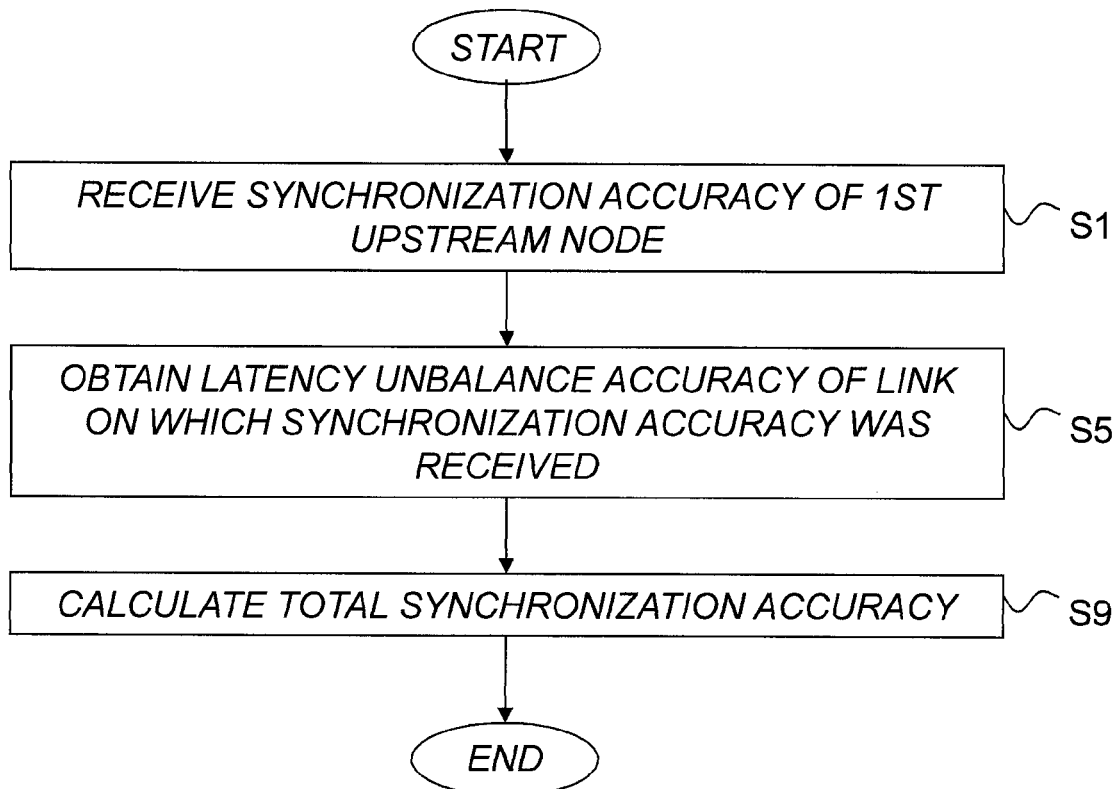
FIG. 9 is a flow diagram of steps of an embodiment of a method for assisting in synchronization of slave clocks in a communication network.

FIG. 9 is a schematic flow diagram illustrating steps of an embodiment of a method for assisting in synchronization of slave clocks in a communication network. In step S1, a message is received in a node of the communication network. The message comprises a representation of a value of a synchronization accuracy of a first upstream node in the communication network. In one embodiment, the received message is a synchronization message from a node comprising a master clock.

In step S5, a value of an accuracy of a link latency unbalance between forward and reverse signalling in a link on which the node received the message is obtained. In step S9, a value of a total synchronization accuracy of the node is calculated. The value of the total synchronization accuracy comprises at least the accuracy of the link latency unbalance of the link on which the node received said message. The node can comprise a TC, a BC or an OC. These different cases are discussed further below.

Figure 10:
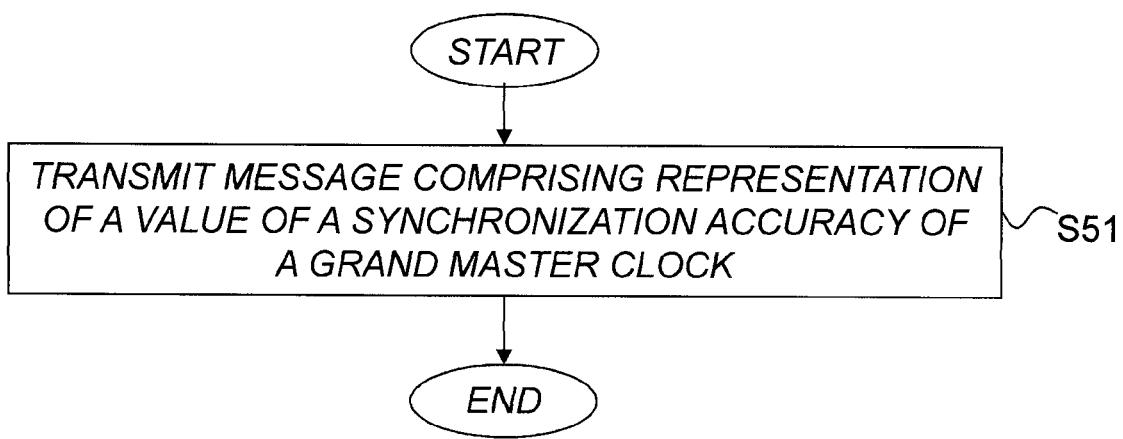
FIG. 10 is a flow diagram of steps of an embodiment of another method for assisting in synchronization of slave clocks in a communication network.

FIG. 10 is a schematic flow diagram illustrating a step of an embodiment of a method for assisting in synchronization of nodes in a communication network. In step S51, a message is transmitted from a node comprising a grand master clock. The message comprises a representation of a value of a synchronization accuracy of the grand master clock. In one embodiment, the transmitted message is a synchronization message to a node comprising a slave clock.

Figure 11A:
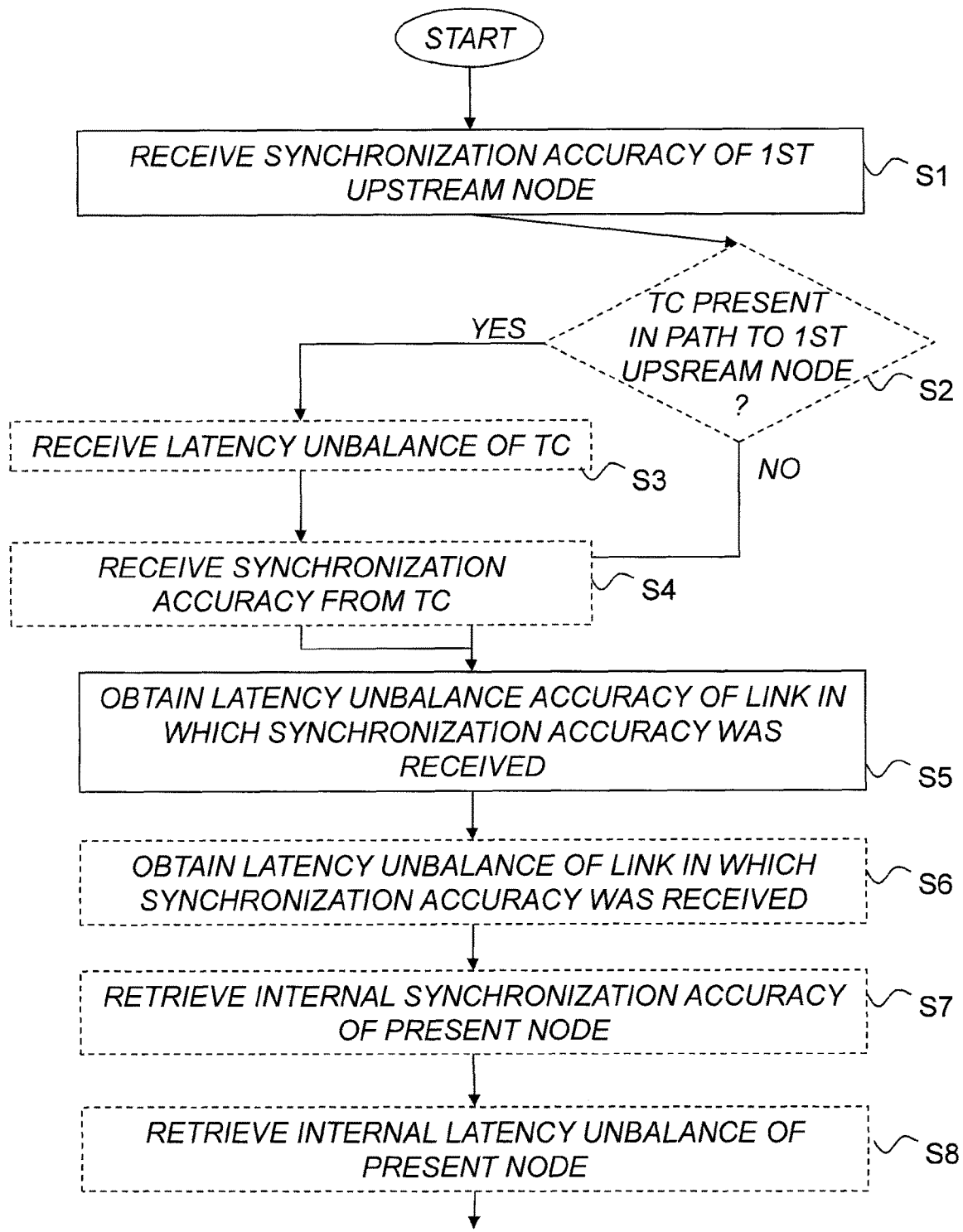
FIG. 11A is a flow diagram of steps of a part of an embodiment of a method for assisting in synchronization of slave clocks in a communication network.

FIG. 11A is a schematic flow diagram illustrating a step of an embodiment of a part of a method for assisting in synchronization of slave clocks in a communication network. This embodiment is performed in a BC or an OC, i.e. the node of the communication network is in this embodiment a node comprising a slave clock. As in FIG. 9, in step S1, a message is received in a node of the communication network.

In step S2, it is checked whether or not there is a TC present in the path to the first upstream node. If this is not the case, the process continues to step S5. The fact that a TC is present, as second upstream node in said communication network, between the node and the master clock typically means that there are contributions to unbalance and inaccuracy from a link between the master clock and the TC and from the TC itself, as well as a delay caused by the forwarding process. The delay is easily taken care of by prior art standard procedures. In step S3, a message is received in the present node. This message comprising a representation of a value of a transparent clock latency unbalance. In step S4, a message is received. This message may in one embodiment be the same message as received in step S3, but in another embodiment, there may be different messages. This message comprises a representation of a value of a transparent clock synchronization accuracy of at least one second upstream node in the communication network. As mentioned earlier, the second upstream node is a node comprising a transparent clock. The dotted character of the steps S2-S4 indicates that the steps are not compulsory. Some embodiments do not comprise any of the steps S2-S4, some embodiments comprise step S2 and S4 but not S3, some embodiments comprise step S2 and S3 but not S4 and some embodiments comprise all steps S2-S4.

In one embodiment, the message of step S3 is a TC delay report message. In one embodiment, the message of step S4 is a TC delay report message. In one embodiment, the combined message of steps S3 and S4 is a TC delay report message.

It should be noted that if multiple TCs are present between the present node and the closest upstream master clock, multiple TC messages and multiple TC latency unbalances and accuracies thereof may be received.

In step S5, as described earlier, a value of an accuracy of a link latency unbalance between forward and reverse signalling in a link on which the node received the message is obtained.

In one embodiment, in step S6 a value of a link latency unbalance between forward and reverse signalling in the link on which the node received the message comprising the synchronization accuracy of the first upstream node is obtained.

In one embodiment, in step S7 a value of an internal synchronization accuracy of the present node is retrieved.

In one embodiment, in step S8 a value of an internal latency unbalance of the present node is retrieved.

The values retrieved in steps S7 and S8 are typically retrieved from memories in the nod itself. Alternatively, the values can be retrieved upon request from another node within or connected to the communication network. An identity or a model type of the present node, may in such a case assist in finding the correct values.

The dotted character of the steps S6-S8 indicates that the steps are not compulsory. Some embodiments do not comprise any of the steps S6-S8, some embodiments comprise one of the steps S6-S8, but not the other ones, some embodiments comprise two of the steps S6-S8, but not the remaining one and some embodiments comprise all steps S6-S8.

Figure 11B:
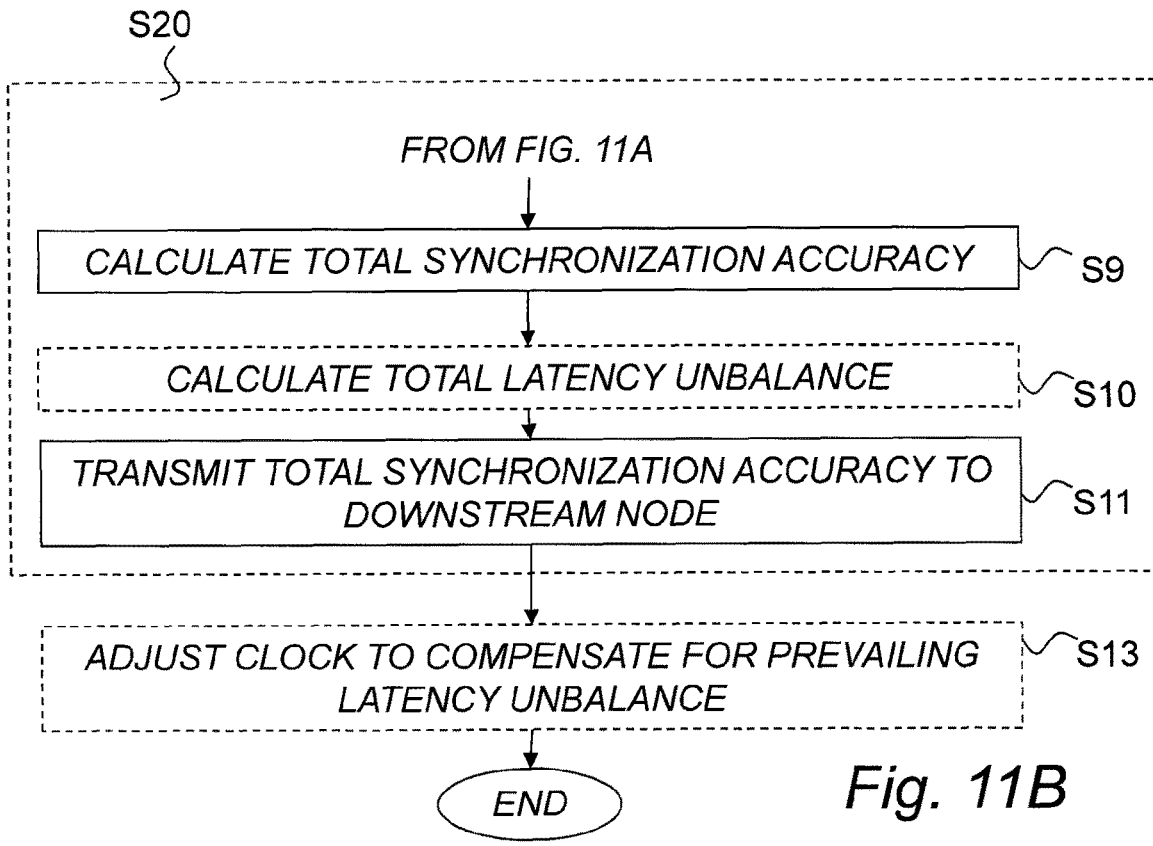
FIG. 11B is a flow diagram of steps of another part of an embodiment of a method for assisting in synchronization of slave clocks in a communication network.
Figure 11C:
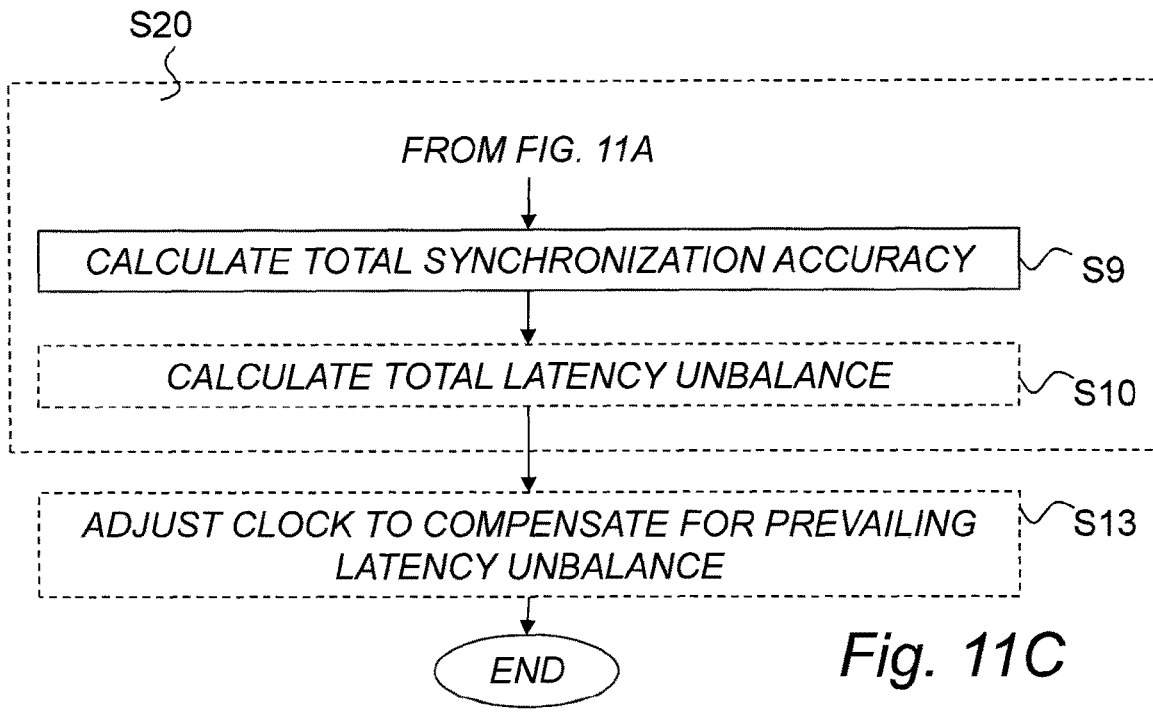
FIG. 11C is a flow diagram of steps of another part of another embodiment of a method for assisting in synchronization of slave clocks in a communication network.

The flow diagram of FIG. 11A continues in FIG. 11B or 11C depending on which type of clock that is comprised in the node.

FIG. 11B is a schematic flow diagram illustrating a step of an embodiment of a part of a method for assisting in synchronization of slave clocks in a communication network as well as of an embodiment of a part of a method for in synchronizing slave clocks in a communication network. This embodiment is performed in a BC, i.e. the node of the communication network is in this embodiment a node comprising a clock that operates as a slave clock with respect to an upstream master clock and that operates as a master clock with respect to downstream slave clocks. In step S9, a value of a total synchronization accuracy of the node is calculated. Depending on which steps in FIG. 11A that was performed, this calculation may be based on different parameters. For all cases, the received synchronization accuracy (step S1) is utilized as well as the obtained synchronization accuracy of the link (step S5). Step S9 then comprises calculation of the value of the total synchronization accuracy as a combination of at least the value of the accuracy of the link latency unbalance of the link on which the node received the message and the value of the synchronization accuracy of the first upstream node.

If Step S7 was performed, also the retrieved internal synchronization accuracy is available. Step S9 then comprises calculation of the value of the total synchronization accuracy as a combination of at least the value of the accuracy of the link latency unbalance of the link on which the node received the message and the value of the internal synchronization accuracy of the node.

If Step S4 was performed, also the received synchronization accuracy of the TC is available. Step S9 then comprises calculation of the value of the total synchronization accuracy as a further combination of the transparent clock synchronization accuracy.

In one embodiment, in step S10 a total latency unbalance of the node is calculated. If steps S6 and S8 are performed, the step S10 comprises calculating a total latency unbalance of the node comprising a sum of the link latency unbalance between forward and reverse signalling in the link on which the node received the message of the synchronization accuracy of the first upstream node and the internal latency unbalance of the node. The dotted character of the step S10 indicates that the step is not compulsory. Some embodiments do not comprise the step S10, while some embodiments comprise step S10.

If steps S6 and S3 are performed, the step S10 comprises calculating a total latency unbalance of the node comprising a sum of said link latency unbalance between forward and reverse signalling in the link on which the node received the message of the synchronization accuracy of the first upstream node and the transparent clock latency unbalance.

If all steps S3, S6 and S8 are performed, the total latency unbalance of the node is a sum of all three components.

In step S11, the total synchronization accuracy is transmitted to a downstream node. In other words, a message is transmitted from the node to a downstream node in the communication network. The message comprises a representation of a value of the total synchronization accuracy of the node. In one embodiment, the message is a synchronization message.

Steps S1-S11 are steps of a method for assisting in synchronization of slave clocks in a communication network, as indicated by the dotted box S20. No actual synchronization is performed within these steps. However, if step S13 is performed, the illustrated flow diagram becomes a method for synchronization of slave clocks in a communication network, in a node comprising a slave clock, since step S13 comprises an active synchronization operation. In step S13, the slave clock of the present node is adjusted to compensate for a prevailing latency unbalance. This prevailing latency unbalance is the link latency unbalance between forward and reverse signalling in the link on which the node received the message of the synchronization accuracy of the first upstream node if only step S6 was performed. If steps S3 and/or S8 were performed, the prevailing latency unbalance is instead the value of the total latency unbalance. Such an adjustment is, as such, known in prior art, c.f. the brief description further above. A person skilled in the art is well acquainted with such methods and no further description is therefore necessary. The adjustment step S13 takes care of the unbalances between the upstream master clock and the present slave clock, preferably including any number of TCs.

In FIG. 11B, the step S11 is illustrated to occur "before" step S13. However, the different steps can be performed in other order as well. In particular, in one embodiment if the message transmitted in step S11 is a synchronizing message, it is an advantage to have the step S13 performed before step S11. The order of the steps of FIG. 11A may also be altered in other embodiments. However, it is of course requested that a certain value is received, obtained or retrieved before it is supposed to be used in any calculation. However, such timing arrangements are easily understood by anyone skilled in the art.

FIG. 11C is a schematic flow diagram illustrating a step of an embodiment of a part of a method for assisting in synchronization of slave clocks in a communication network as well as of an embodiment of a part of a method for in synchronizing slave clocks in a communication network. This embodiment is performed in an OC, i.e. the node of the communication network is in this embodiment a node comprising a clock that only operates as a slave clock with respect to an upstream master clock.

The steps of FIG. 11C corresponds to the steps of FIG. 11B except for the step S11.

Figure 12:
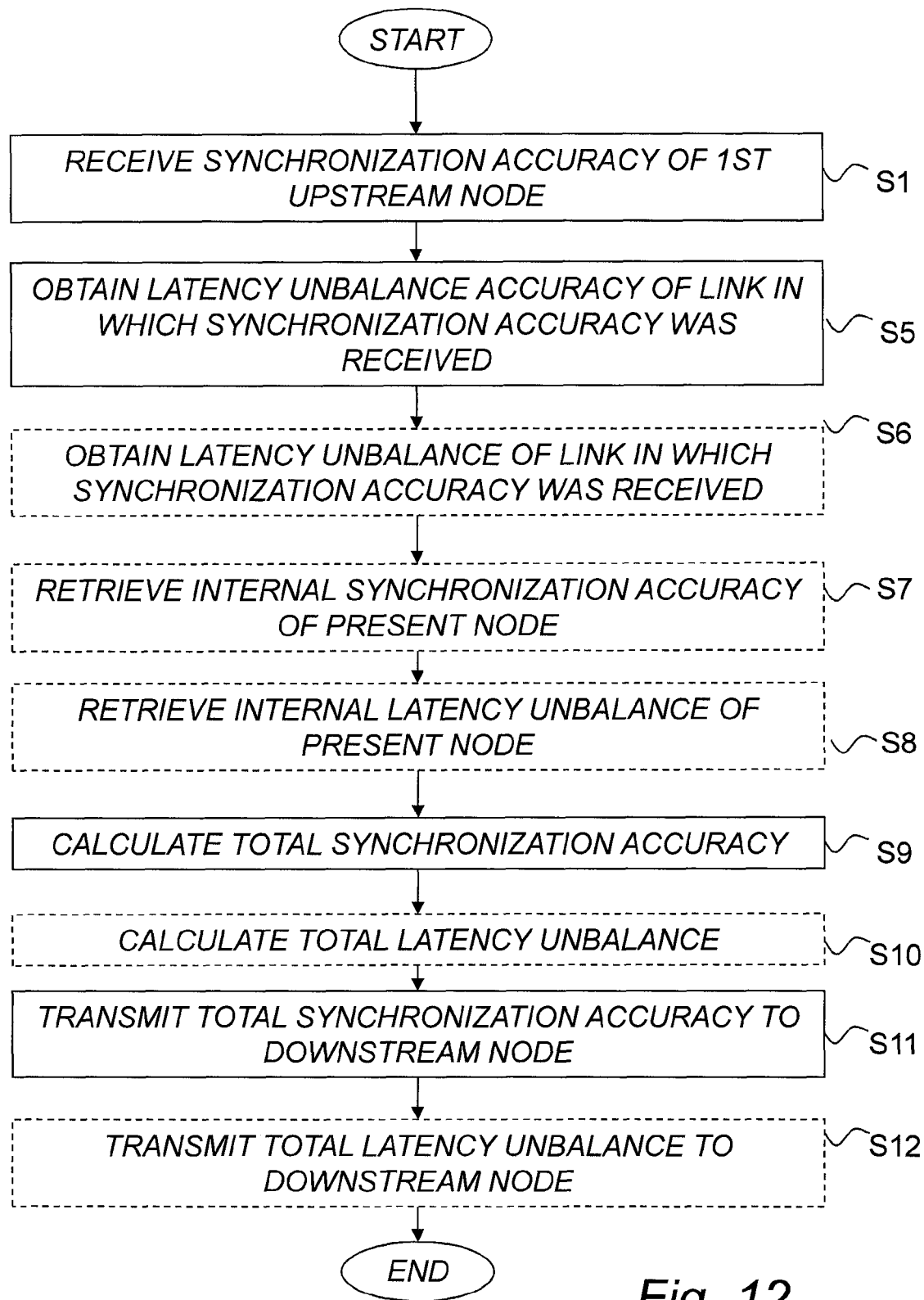
FIG. 12 is a flow diagram of steps of another embodiment of another method for assisting in synchronization of slave clocks in a communication network.

FIG. 12 is a schematic flow diagram illustrating a step of an embodiment of a part of a method for assisting in synchronization of slave clocks in a communication network. This embodiment is performed in a node comprising a TC, i.e. the node of the communication network is in this embodiment a node configured for forwarding synchronization messages between a master clock and a slave clock. As in FIG. 9, in step S1, a message is received in a node of the communication network.

The present node is a TC, which means that, according to prevailing standard procedures, synchronizing messages are to be forwarded to the end receiver without any changes made to the message. If the message received in step S1 was incorporated in the synchronization message, the value of the synchronization accuracy will therefore automatically also be forwarded. Therefore, in one embodiment, the message comprising the representation of the value of the synchronization accuracy of the first upstream node is forwarded to the downstream node.

Steps S5-S7 are performed in analogy with steps S5-S7 of FIG. 11A. Steps S9-S11 are performed in analogy with steps S9-S11 of FIG. 11B.

A TC does not itself synchronize with the master clock. As a consequence, any latency unbalances occurring upstream relative to the TC cannot be compensated for by the TC itself. Therefore, it is preferred if such latency unbalances are reported downstream. In one embodiment, in step S12, a message is transmitted from the present TC node to the downstream node. The message can be the same as used in step S11 or another one. In one embodiment, the messages of at least one of S11 and S12 is the TC delay report message. The message comprises a representation of the value of the total latency unbalance or the link latency unbalance between forward and reverse signalling in the link on which the node received the message of the synchronization accuracy of the first upstream node, depending on what is available. The dotted character of the step S12 indicates that the step is not compulsory. Some embodiments do not comprise the step S12, while some embodiments comprise step S12.

The proposed technology may be applied to a node, which may be a wired or wireless device.

As used herein, the non-limiting terms "User Equipment (UE)", "station (STA)" and "wireless communication device" may refer to a mobile phone, a cellular phone, a Personal Digital Assistant (PDA) equipped with radio communication capabilities, a smart phone, a laptop or Personal Computer (PC) equipped with an internal or external mobile broadband modem, a tablet PC with radio communication capabilities, a target device, a device to device UE, a machine type UE or UE capable of machine to machine communication, iPAD, Customer Premises Equipment (CPE), Laptop Embedded Equipment (LEE), Laptop Mounted Equipment (LME), Universal Serial Bus (USB) dongle, a portable electronic radio communication device, a sensor device equipped with radio communication capabilities or the like. In particular, the term "UE", the term "Station" and the term "wireless communication device" should be interpreted as non-limiting terms comprising any type of wireless device communicating with a network node in a wireless communication system and/or possibly communicating directly with another wireless communication device. In other words, a wireless communication device may be any device equipped with circuitry for wireless communication according to any relevant standard for communication.

As used herein, the term "wired device" may refer to any device configured or prepared for wired connection to a network. In particular, the wired device may be at least some of the above devices, with or without radio communication capability, when configured for wired connection.

As used herein, the non-limiting term "node" or "network node" may refer to base stations, access points, network control nodes such as network controllers, radio network controllers, base station controllers, access controllers, and the like. In particular, the term "base station" may encompass different types of radio base stations including standardized base stations such as Node Bs, or evolved Node Bs (eNB) and also macro/micro/pico radio base stations, home base stations, also known as femto base stations, relay nodes, repeaters, radio access points, Base Transceiver Stations (BTS), and even radio control nodes controlling one or more Remote Radio Units (RRU), or the like.

By the term "clock" may also be understood the device or node comprising the actual clock functionality.

In the following, the general non-limiting term "communication unit" includes network nodes and/or associated wireless devices.

As used herein, the term "network device" may refer to any device located in connection with a communication network, including but not limited to devices in access networks, core networks and similar network structures. The term network device may also encompass cloud-based network devices.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

According to an aspect of the proposed technology there is provided a node intended to be used in a communication network. The node is configured to receive a message comprising a representation of a value of a synchronization accuracy of a first upstream node in the communication network. The node is further configured to obtain a value of an accuracy of a link latency unbalance between forward and reverse signalling in a link on which the node received the message from the first upstream node. The node is further configured to calculate a value of a total synchronization accuracy of the node comprising at least the accuracy of the link latency unbalance of the link.

Figure 13:
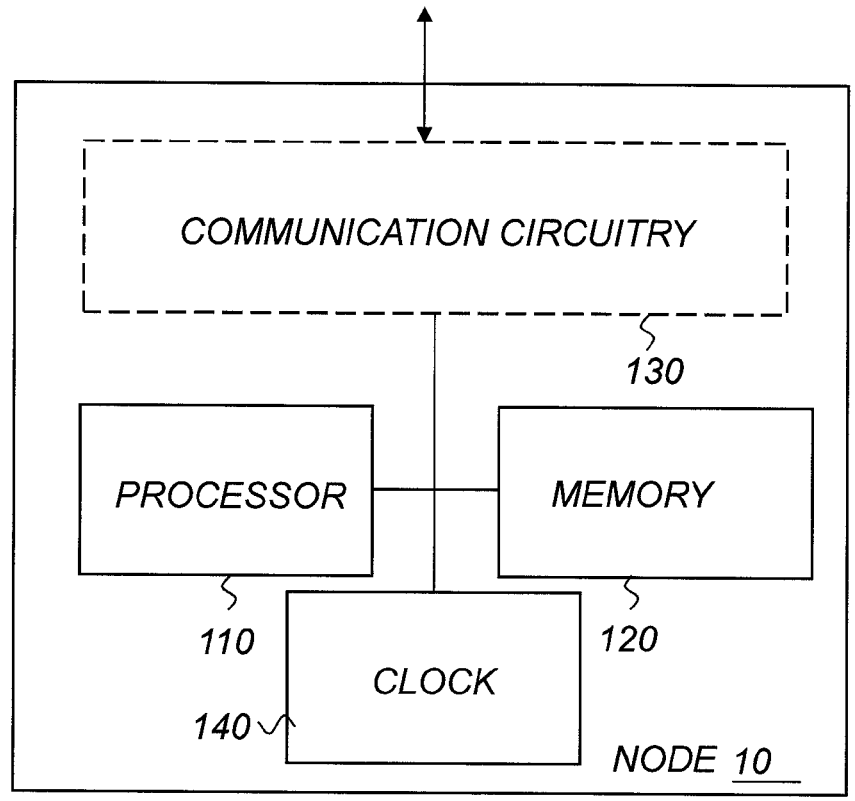
FIG. 13 is a schematic illustration of an embodiment of a node configured for assisting in synchronization of slave clocks in a communication network.

FIG. 13 is a schematic block diagram illustrating an example of a node 10, based on a processor-memory implementation according to an embodiment. In this particular example, the node 10 comprises a processor 110 and a memory 120. The memory 120 comprises instructions executable by the processor 110.

In one embodiment, whereby the processor is operative to obtain the value of the accuracy of the link latency unbalance and to calculate the value of the total synchronization accuracy.

Optionally, the node 10 may also include a communication circuit 130. The communication circuit 130 may include functions for wired and/or wireless communication with other devices and/or network nodes in the network. In a particular example, the communication circuit 130 may be based on radio circuitry for communication with one or more other nodes, including transmitting and/or receiving information. In another particular example, the communication circuit 130 may be based on circuitry for optical link communication with one or more other nodes, including transmitting and/or receiving information. In another particular example, the communication circuit 130 may be based on circuitry for electrical wire link communication with one or more other nodes, including transmitting and/or receiving information. The communication circuit 130 may be interconnected to the processor 110 and/or memory 120. By way of example, the communication circuit 130 may include any of the following: a receiver, a transmitter, a transceiver, input/output (I/O) circuitry, input port(s) and/or output port(s).

In one embodiment, the node comprises communication circuitry configured to receive the message comprising the representation of the value of the synchronization accuracy of the first upstream node.

In one embodiment, the node is further configured to retrieve a value of an internal synchronization accuracy of the node. Thereby, the calculation of a value of a total synchronization accuracy comprises calculating the value of the total synchronization accuracy as a combination of at least the value of said accuracy of the link latency unbalance of the link on which the node received the message and the value of the internal synchronization accuracy of the node.

In one embodiment, the node is further configured to perform the obtaining of a value of an accuracy of a link latency unbalance by retrieving information associated with the value of the accuracy of the link latency unbalance. The retrieving is performed from a memory in a connection of the link on which the node received the message.

In another embodiment, the node is further configured to perform the obtaining of a value of an accuracy of a link latency unbalance by transmitting a request for a value of an accuracy of a link latency unbalance to a synchronization support node of the communication network. The request comprises information of an identity and/or model type of the link on which the node received the message. The obtaining further comprises receiving, from the synchronization support node, information associated with the value of the accuracy of the link latency unbalance.

In yet another embodiment, the node is further configured to perform the obtaining of a value of an accuracy of a link latency unbalance by retrieving information associated with the value of the accuracy of the link latency unbalance. The retrieving is in this embodiment performed from a memory of the node.

In a further embodiment, the information associated with the value of the accuracy of the link latency unbalance comprises an absolute value of the accuracy of the link latency unbalance.

In another further embodiment, the information associated with the value of the accuracy of the link latency unbalance comprises a specific value of an accuracy of the link latency unbalance. The specific value is expressed as an accuracy per unit length of the link and/or an accuracy per unit transmission time of the link. The node is thereby further configured to perform the obtaining of a value of an accuracy of the link latency unbalance by further deriving an absolute value of the accuracy of the link latency unbalance based on the specific value of the accuracy of the link latency unbalance.

In one embodiment, the node is further configured to perform the calculation of a value of a total synchronization accuracy by calculating the value of the total synchronization accuracy as a combination of at least the value of the accuracy of the link latency unbalance of the link on which the node received the message and the value of the synchronization accuracy of the first upstream node.

In one embodiment, the node is further configured to perform the calculation of a value of a total synchronization accuracy by calculating the value of the total synchronization accuracy as a combination of at least the value of the accuracy of the link latency unbalance of the link on which the node received the message, the value of the synchronization accuracy of the first upstream node, and the value of the internal synchronization accuracy of the node.

In one embodiment, the values of the synchronization accuracy of the first upstream node and the accuracy of the link latency unbalance of the link on which the node received the message, the total synchronization accuracy of the node, and the internal synchronization accuracy of the node, if any, are expressed in terms of a representation of accuracy standard deviation and/or a representation of a worst case accuracy interval, of respective accuracies.

In one embodiment, the node is further configured to transmit a message comprising a representation of a value of the total synchronization accuracy of the node. This message is transmitted from the node to a downstream node in the communication network.

In one embodiment, the node comprises a transparent clock.

In a further embodiment, the node is further configured to forward the message comprising the representation of the value of the synchronization accuracy of the first upstream node to the downstream node.

In one embodiment, the node comprises a slave clock.

In a further embodiment, the node is further configured to receive at least one message comprising a representation of a value of a transparent clock synchronization accuracy of at least one second upstream node in the communication network. The second upstream node is a node comprising a transparent clock. The node is therefore further configured to perform the calculation of a value of a total synchronization accuracy by calculating the value of the total synchronization accuracy as a further combination of the at least one transparent clock synchronization accuracy.

In one embodiment, the node is further configured to obtain a value of a link latency unbalance between forward and reverse signalling in the link on which the node received the message.

In a further embodiment, the node is further configured to perform the obtaining of a value of a link latency unbalance by retrieving information associated with the value of the link latency unbalance. The retrieving is performed from a memory in a connection of the link on which the node received the message.

In another further embodiment, the node is further configured to perform the obtaining of a value of a link latency unbalance by transmitting a request for a value of a link latency unbalance to a synchronization support node of the communication network. The request comprises information of an identity and/or model type of the link on which the node received said message. The obtaining further comprises receiving, from the synchronization support node, information associated with the value of the link latency unbalance.

In yet another further embodiment, the node is further configured to perform the obtaining of a value of a link latency unbalance by retrieving information associated with the value of the link latency unbalance. The retrieving is in this embodiment performed from a memory of the node.

In a further embodiment, the information associated with the value of the link latency unbalance comprises an absolute value of the link latency unbalance.

In yet a further embodiment, the information associated with the value of the link latency unbalance comprises a specific value of the link latency unbalance. The specific value is expressed as a link latency unbalance per unit length of the link and/or a link latency unbalance per unit transmission time of the link. The node is therefore further configured to perform the obtaining of a value of a link latency unbalance by further deriving an absolute value of the link latency unbalance based on the specific value of link latency unbalance.

In one embodiment, the node is further configured to retrieve a value of an internal latency unbalance of the node, and to calculate a total latency unbalance of the node comprising a sum of the link latency unbalance between forward and reverse signalling in the link on which the node received the message and the internal latency unbalance of the node.

In one embodiment, the node is further configured to receive a message comprising a representation of a value of a transparent clock latency unbalance of the first upstream node or at least one second upstream node in the communication network. The node is further configured to calculate a total latency unbalance of the node comprising a sum of the link latency unbalance between forward and reverse signalling in the link on which the node received the message and the transparent clock latency unbalance of the first neighbouring node.

In one embodiment, the node comprises a transparent clock, and the node is further configured to transmit, to the downstream node, a message comprising a representation of the value of the total latency unbalance and/or the link latency unbalance between forward and reverse signalling in the link on which the node received the message.

In one embodiment, the node comprises a slave clock. The node is further configured to adjust the slave clock to compensate for a prevailing latency unbalance. The prevailing latency unbalance is the value of the total latency unbalance or the link latency unbalance between forward and reverse signalling in the link on which the node received the message.

According to an aspect of the proposed technology there is provided a node in a communication network. The node is configured to transmit a message comprising a representation of a value of a synchronization accuracy of a grand master clock comprised in the node.

In further reference to FIG. 13, the node 10 may also include a communication circuit 130. The communication circuit 130 may include functions for wired and/or wireless communication with other devices and/or network nodes in the network. In a particular example, the communication circuit 130 may be based on radio circuitry for communication with one or more other nodes, including transmitting and/or receiving information. In another particular example, the communication circuit 130 may be based on circuitry for optical link communication with one or more other nodes, including transmitting and/or receiving information. In another particular example, the communication circuit 130 may be based on circuitry for electrical wire link communication with one or more other nodes, including transmitting and/or receiving information. The communication circuit 130 may be interconnected to the processor 110 and/or memory 120. By way of example, the communication circuit 130 may include any of the following: a receiver, a transmitter, a transceiver, input/output (I/O) circuitry, input port(s) and/or output port(s).

In one embodiment, the node comprises communication circuitry configured to transmit the message comprising the representation of the value of the synchronization accuracy.

Figure 14:
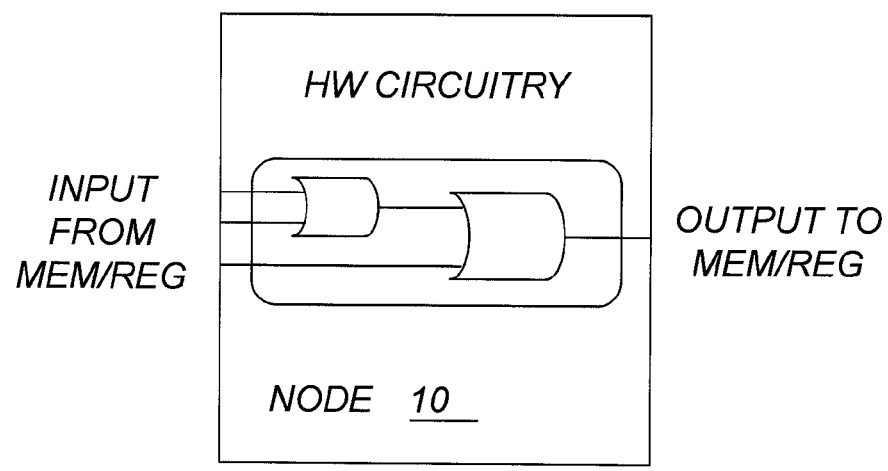
FIG. 14 is a schematic illustration of another embodiment of a node configured for assisting in synchronization of slave clocks in a communication network.

FIG. 14 is a schematic block diagram illustrating another example of a node 10, based on a hardware circuitry implementation according to an embodiment. Particular examples of suitable hardware (HW) circuitry include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG), and/or memory units (MEM).

Figure 15:
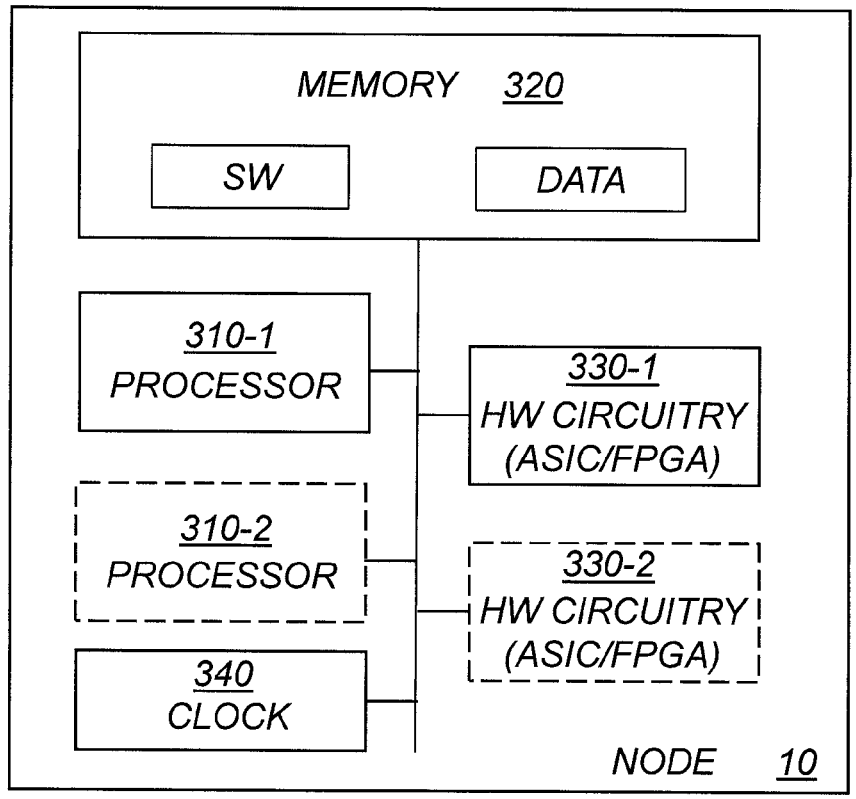
FIG. 15 is a schematic illustration of yet another embodiment of a node configured for assisting in synchronization of slave clocks in a communication network.

FIG. 15 is a schematic block diagram illustrating yet another example of a node 10, based on combination of both processor(s) 310-1, 310-2 and hardware circuitry 330-1, 330-2 in connection with suitable memory unit(s) 320. The arrangement 300 comprises one or more processors 310-1, 310-2, memory 320 including storage for software and data, and one or more units of hardware circuitry 330-1, 330-2 such as ASICs and/or FPGAs. The overall functionality is thus partitioned between programmed software (SW) for execution on one or more processors 310-1, 310-2, and one or more pre-configured or possibly reconfigurable hardware circuits 330-1, 330-2 such as ASICs and/or FPGAs. The actual hardware-software partitioning can be decided by a system designer based on a number of factors including processing speed, cost of implementation and other requirements. The node 10 comprises a clock 340, which the processor(s) 310-1, 310-2 uses for defining a reference time.

Alternatively, or as a complement, at least some of the steps, functions, procedures, modules and/or blocks described herein may be implemented in software such as a computer program for execution by suitable processing circuitry such as one or more processors or processing units.

The flow diagram or diagrams presented herein may therefore be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 16:
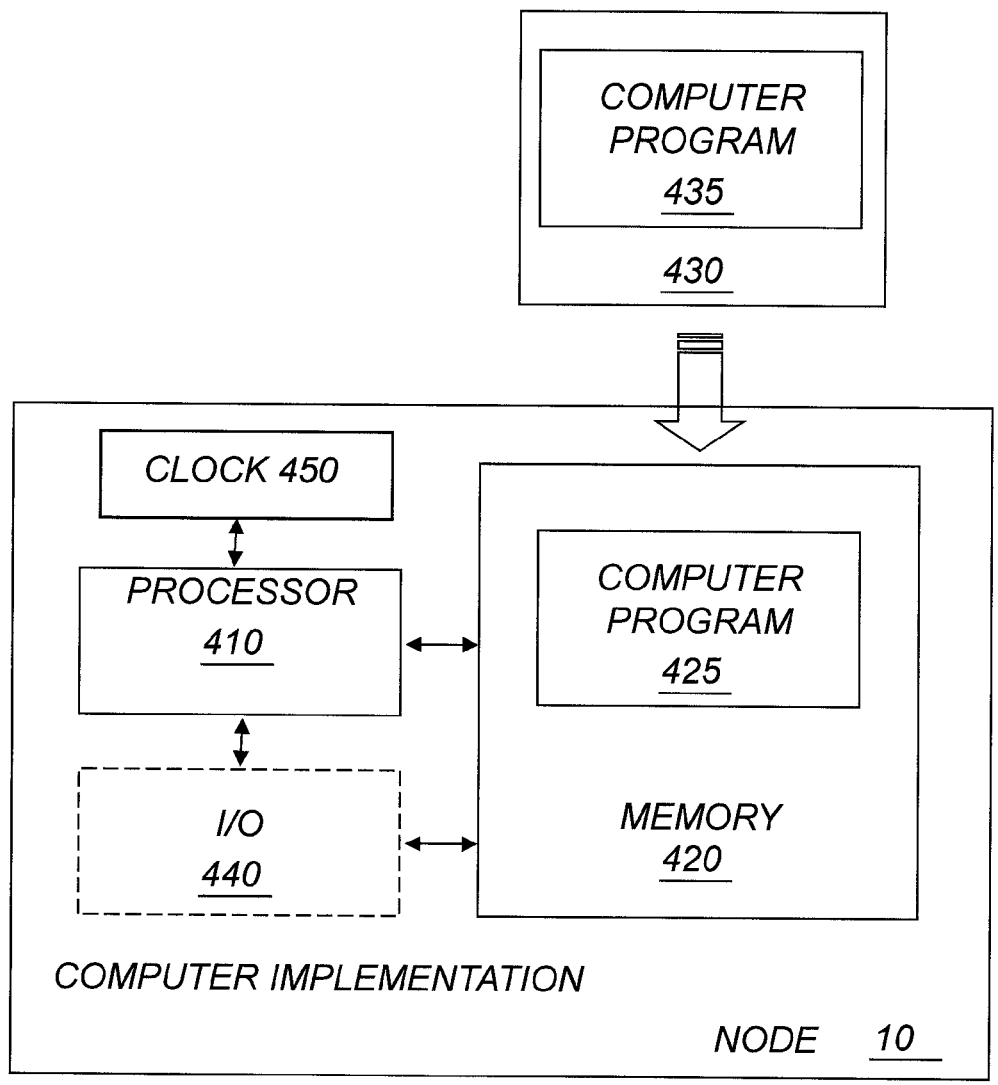
FIG. 16 is a schematic illustration of another embodiment of a node configured for assisting in synchronization of slave clocks in a communication network based in a computer implementation.

FIG. 16 is a schematic diagram illustrating an example of a computer-implementation of a node 10 according to an embodiment. In this particular example, at least some of the steps, functions, procedures, modules and/or blocks described herein are implemented in a computer program 425; 435, which is loaded into the memory 420 for execution by processing circuitry including one or more processors 410. The processor(s) 410 and memory 420 are interconnected to each other to enable normal software execution. An optional input/output device 440 may also be interconnected to the processor(s) 410 and/or the memory 420 to enable input and/or output of relevant data such as input parameter(s) and/or resulting output parameter(s). The node 10 comprises a clock 450, which the processor 410 uses for defining a reference time.

The term 'processor' should be interpreted in a general sense as any system or device capable of executing program code or computer program instructions to perform a particular processing, determining or computing task.

The processing circuitry including one or more processors 410 is thus configured to perform, when executing the computer program 425, well-defined processing tasks such as those described herein.

The processing circuitry does not have to be dedicated to only execute the above-described steps, functions, procedure and/or blocks, but may also execute other tasks.

In a particular embodiment, the computer program 425; 435 comprises instructions, which when executed by at least one processor 410, cause the processor(s) 410 to receive a message comprising a representation of a value of a synchronization accuracy of a first upstream node in the communication network, to obtain a value of an accuracy of a link latency unbalance between forward and reverse signalling in a link on which the node received the message from the first upstream node, and to calculate a value of a total synchronization accuracy of the node comprising at least the accuracy of the link latency unbalance of the link.

In another particular embodiment, the computer program 425; 435 comprises instructions, which when executed by at least one processor 410, cause the processor(s) 410 to transmit a message comprising a representation of a value of a synchronization accuracy of a grand master clock comprised in the node.

In a particular embodiment, a computer program comprises instructions, which when executed by at least one processor, cause the processor(s) to receive a message comprising a representation of a value of a synchronization accuracy of a first upstream node in the communication network. The instructions, when executed by the processor(s), further cause the processor(s) to obtain a value of an accuracy of a link latency unbalance between forward and reverse signalling in a link on which the message was received. The instructions, which when executed by the processor(s), further cause the processor(s) to calculate a value of a total synchronization accuracy of the node comprising at least the accuracy of the link latency unbalance of the link.

In a particular embodiment, a computer program comprises instructions, which when executed by at least one processor, cause the processor(s) to transmit a message comprising a representation of a value of a synchronization accuracy of a grand master clock comprised in a same node as comprising the processor(s).

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 425; 435 may be realized as a computer program product, which is normally carried or stored on a computer-readable medium 420; 430, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

Figure 17:
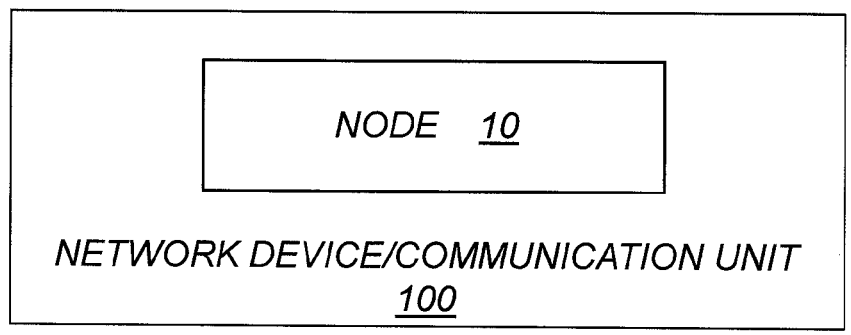
FIG. 17 is a schematic illustration of an embodiment of a network device or communication unit comprising a node configured for assisting in synchronization of slave clocks in a communication network.

FIG. 17 is a schematic block diagram illustrating an example of a network device/communication unit 100 comprising a node 10 according to any of the embodiments.

According to an aspect, there is provided a network device 100 comprising an node 10 as described herein.

The network device may be any suitable network device in the wireless communication system, or a network device in connection with the wireless communication system. By way of example, the network device may be a suitable network node such a base station or an access point. However, the network device may alternatively be a cloud-implemented network device.

According to another aspect, there is provided a communication unit 100 in a wireless communication system, wherein the communication unit 100 comprises a node 10 as described herein. The communication unit may be any suitable communication unit in the wireless communication system. By way of example, the communication unit may be a wireless communication device such as a UE, STA or similar end-user device.

In the embodiments described above, the proposed solutions are based on an assumption that as much as possible of the present standards should be utilized also together with the new ideas. However, this is not any compulsory requirement. At the contrary, there are numerous alternative embodiments using routines that are not used within the standards of today.

For example, the information about unbalance and accuracies sent between the different nodes can in certain embodiments be implemented by utilizing already present messages, e.g. by adding or modifying different information fields. However, it is also possible to arrange for new messages. In such a way the timing of the messages may be made independent on the timing of the already present messages.

Figure 18:
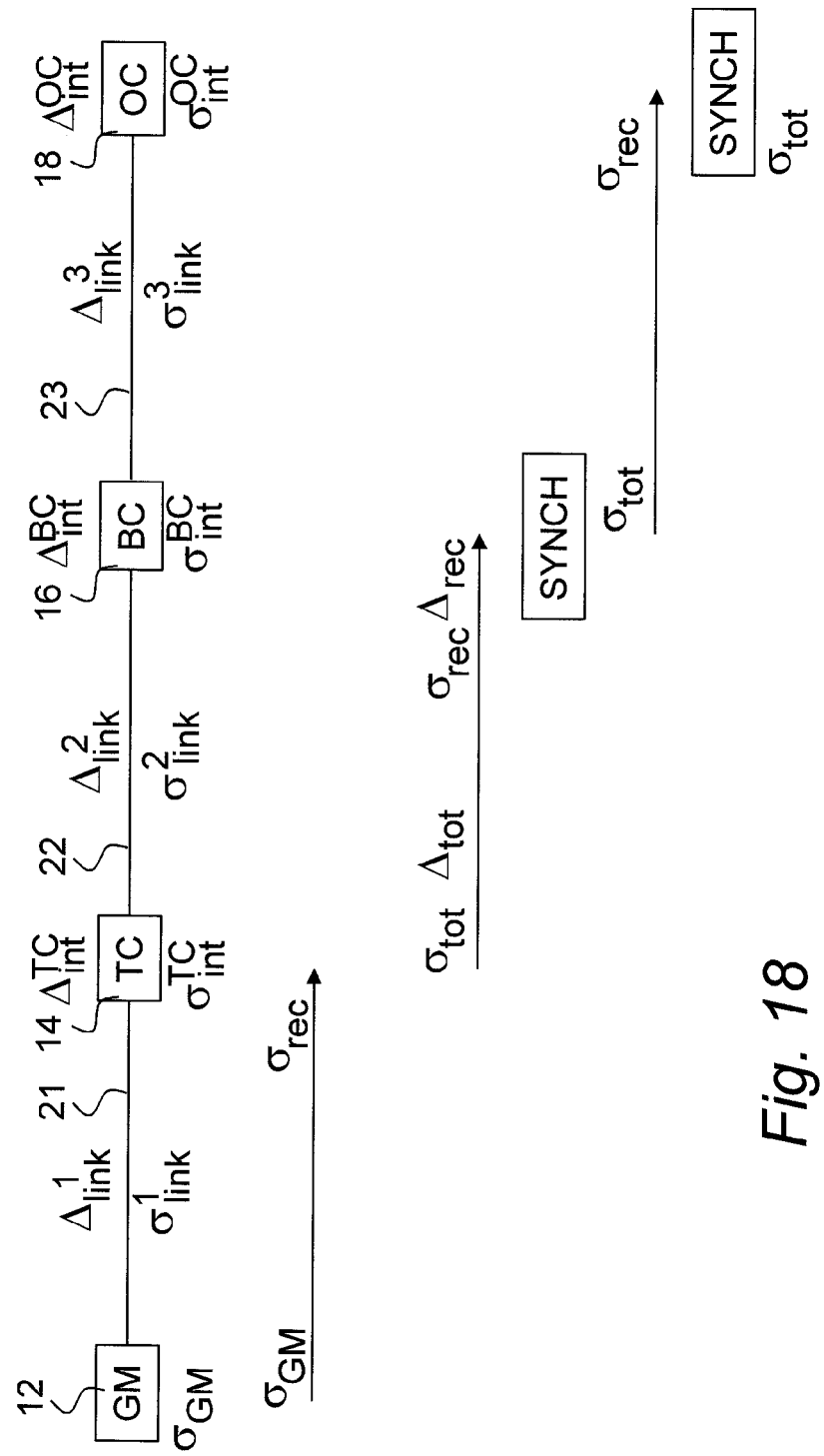
FIG. 18 is a schematic illustration of another embodiment of signaling in another method for assisting in synchronization of slave clocks in a communication network.

FIG. 18 schematically illustrates one embodiment, where the TC is no longer transparent concerning the reporting of the synchronization accuracy of a master clock. In such an embodiment, the TC terminates or at least monitors messages received incorporating a synchronization accuracy of a master clock. The message as such may be forwarded according to previous normal procedures if requested. If a synchronization accuracy of a master clock is present, the TC may use this value to be incorporated in its own total synchronization accuracy and being sent downstream towards the intended receiver of the original message. If more than one TC is present between a master clock and a slave clock, they will thereby successively update the synchronization accuracy, TC by TC and link by link. The final receiving node, a BC or OC, will then have only one received synchronization accuracy measure to base its own total synchronization accuracy measure on.

Figure 19A:
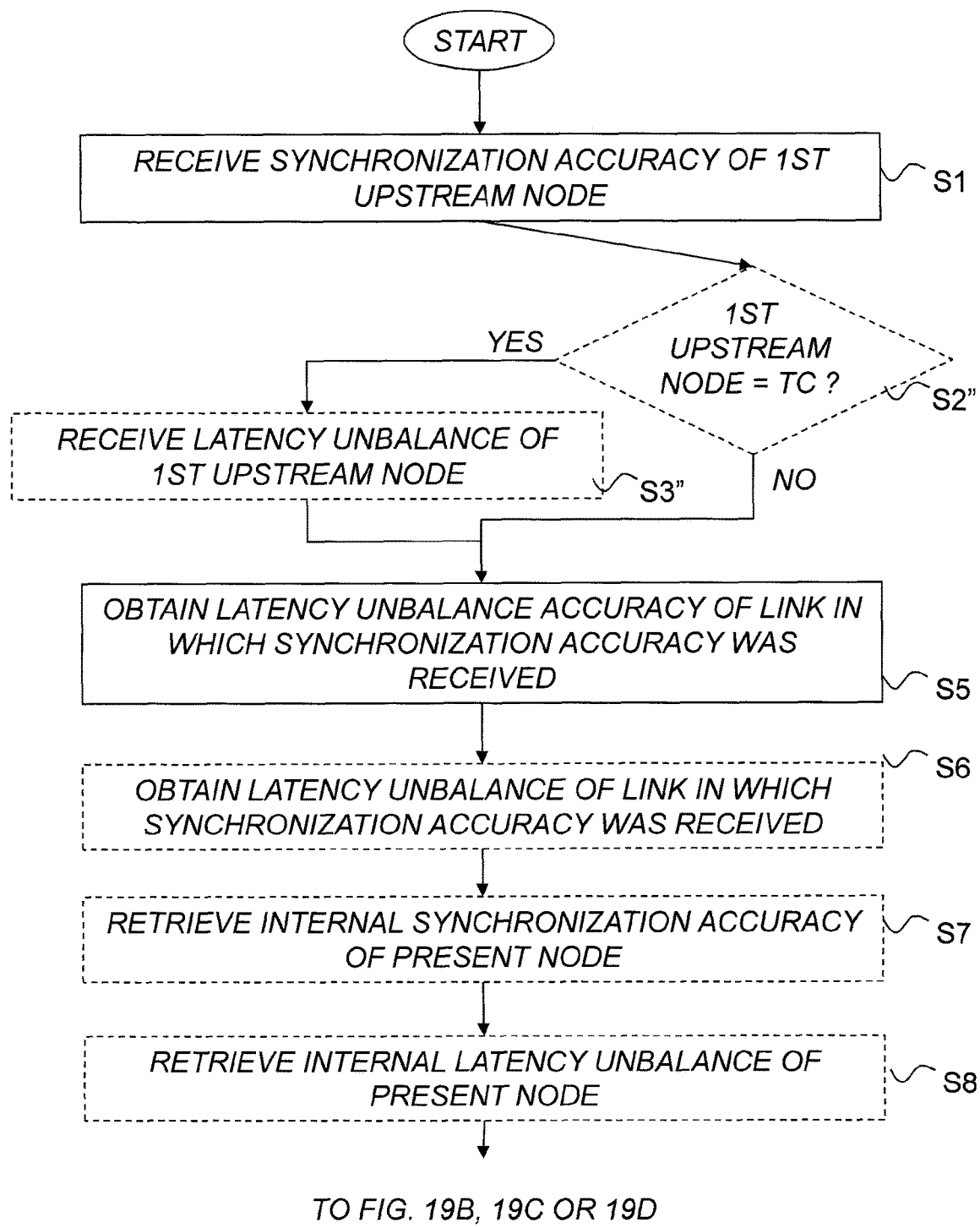
FIGS. 19A-D are flow diagrams of steps of parts of other embodiments of methods for assisting in synchronization of slave clocks in a communication network and FIGS. 20A-B are schematic illustrations of embodiments of nodes for assisting in synchronization of slave clocks in a communication network.

FIG. 19A illustrates a flow diagram of steps of a part of an embodiment of a method for assisting in synchronization of slave clocks in a communication network. Most steps are analogue to the previous presented steps. In step S2", the first upstream node may in this embodiment be a TC, and in step S3", a latency unbalance from the TC, including the latency unbalance of the master clock can be received.

Figure 19B:
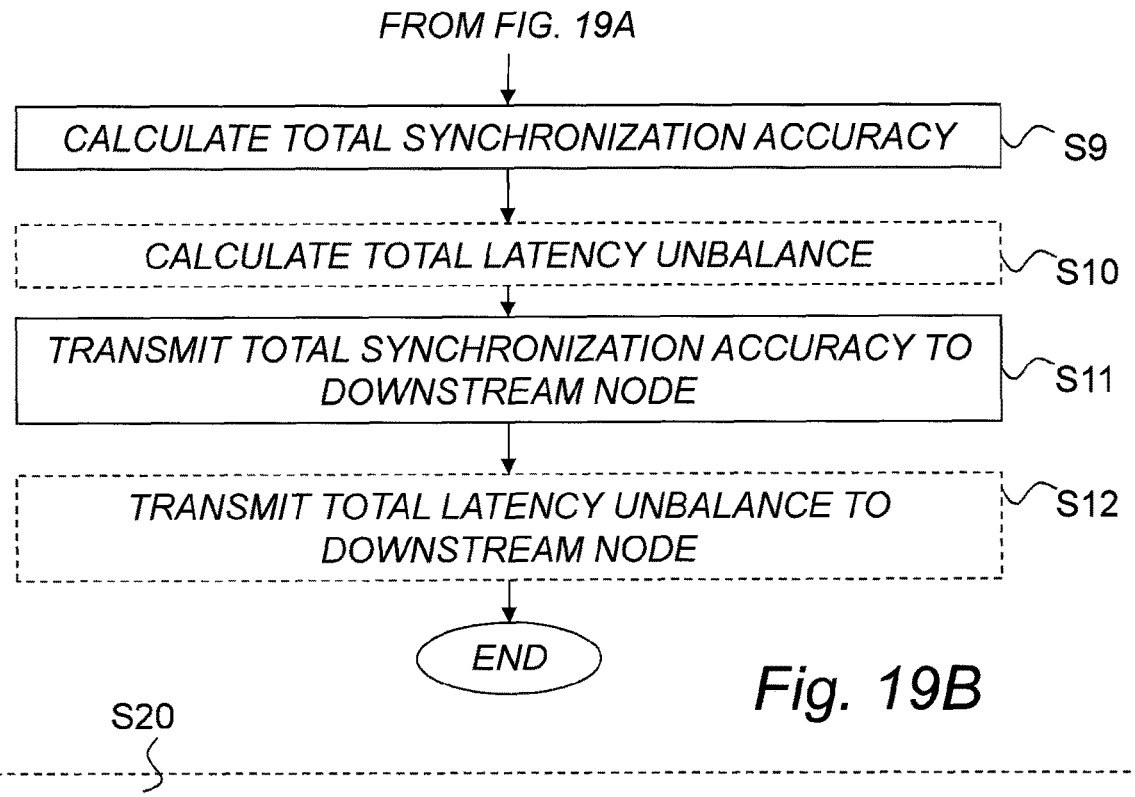

FIG. 19B illustrates a flow diagram of steps of a part of an embodiment of a method for assisting in synchronization of slave clocks in a communication network, performed in a TC. This flow diagram can be seen as a continuation of FIG. 19B.

Figure 19C:
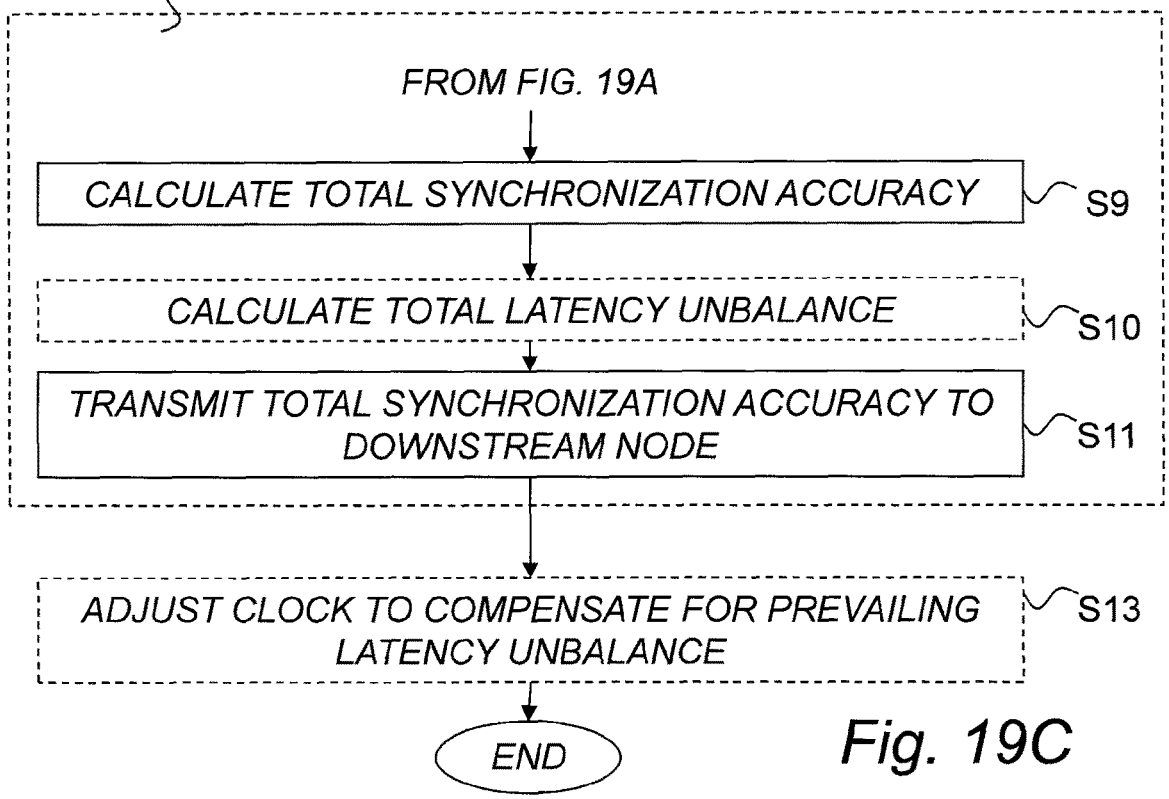
Figure 19D:
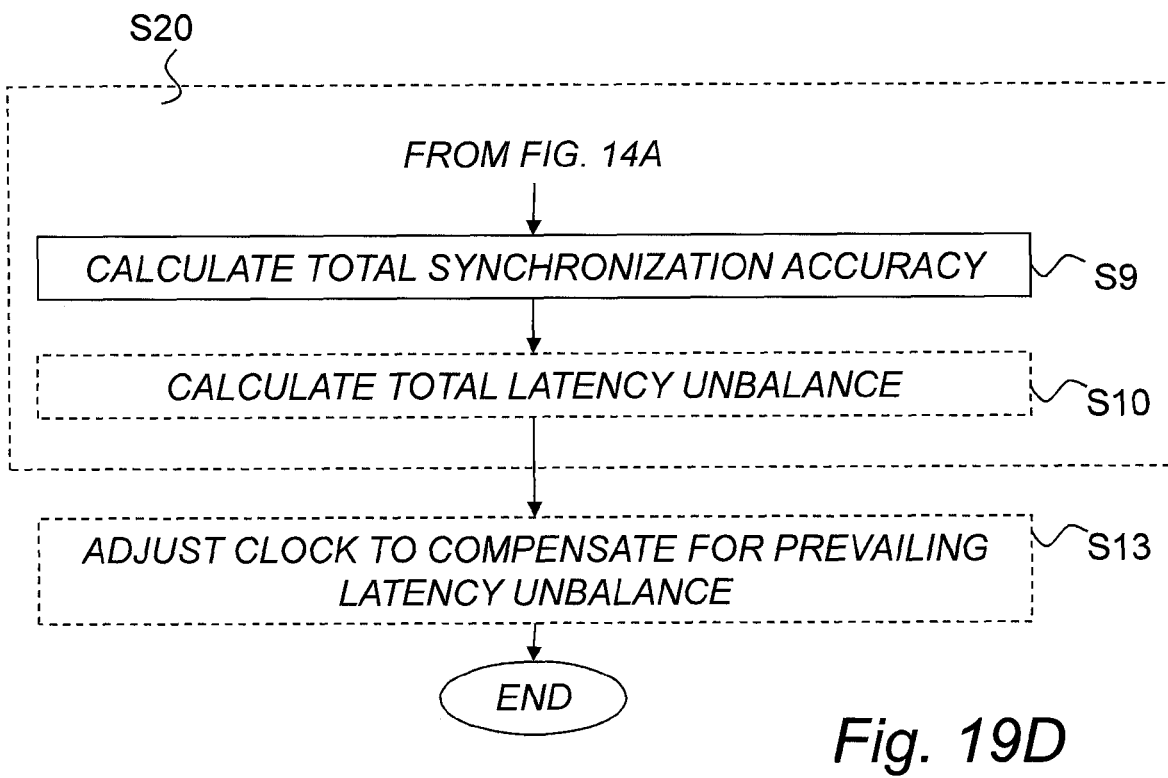

FIGS. 19C and 19D are then flow diagrams of steps of parts of embodiments of methods for assisting in synchronization of slave clocks in a communication network, performed in a BC or OC, respectively.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 20A:
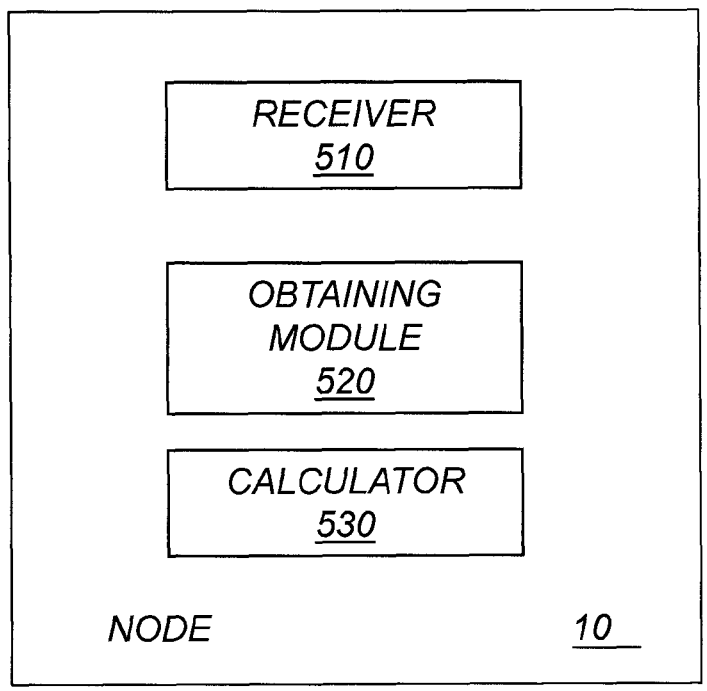

FIG. 20A is a schematic diagram illustrating an example of a node 10 for assisting in synchronization of slave clocks in a communication network. The node 10 comprises a receiver 510, for receiving a message comprising a representation of a value of a synchronization accuracy of a first upstream node in the communication network. The node 10 further comprises an obtaining module 520, for obtaining a value of an accuracy of a link latency unbalance between forward and reverse signalling in a link on which the node received the message. The node 10 further comprises a calculator 530, connected to the receiver and the obtaining module, for calculating a value of a total synchronization accuracy of the node comprising at least the accuracy of the link latency unbalance of the link on which the node received the message.

Figure 20B:
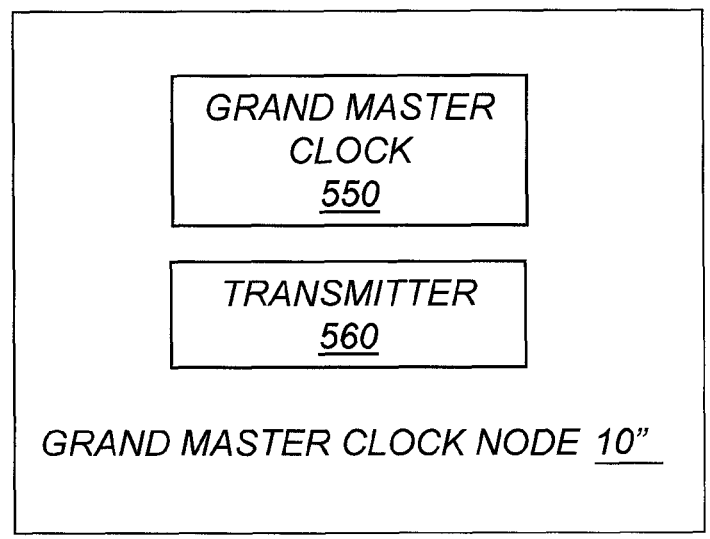

FIG. 20B is a schematic diagram illustrating an example of a grand master clock node 10" for assisting in synchronization of slave clocks in a communication network. The node 10" comprises a grand master clock 550 and a transmitter 560 for transmitting a message comprising a representation of a value of a synchronization accuracy of the grand master clock.

Alternatively it is possible to realize the module(s) in FIGS. 20A-B predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

ABBREVIATIONS

ASIC Application Specific Integrated Circuits
BC Boundary Clock (IEEE 1588 v2)
BTS Base Transceiver Stations
CD Compact Disc
COTS Common Off-The-Shelf
CPE Customer Premises Equipment
CPU Central Processing Units
DSP Digital Signal Processors
DVD Digital Versatile Disc
eNB evolved Node B
FPGA Field Programmable Gate Arrays
GM Grand Master (IEEE 1588 v2)
HDD Hard Disk Drive
HW hardware
I/O input/output
LEE Laptop Embedded Equipment
LME Laptop Mounted Equipment
LTE Long-Term Evolution
MEM memory units
NI Network Interfaces
NIC Network Interface Controller
OC Ordinary Clock (IEEE 1588 v2)
OS Operating System
OSS Operations and Support System
OTDOA Observed Time Difference Of Arrival
PC Personal Computer
PDA Personal Digital Assistant
PLC Programmable Logic Controllers
RAM Random Access Memory
REG registers
ROM Read-Only Memory
RRU Remote Radio Units
STA Station
SW software
TC Transparent Clock (IEEE 1588 v2)
TDD Time Division Duplex
UE User Equipment
USB Universal Serial Bus
WNIC Wireless Network Interface Controller

REFERENCES

IEEE 1588 v2 (2008), pages 1-8, 34 and FIG. 12.

The invention claimed is:

1. A method for assisting in synchronization of slave clocks in a communication network, comprising:
    receiving, in a node of said communication network, a message comprising a value of a synchronization accuracy of a first upstream node in said communication network;
    transmitting a request for a value of an accuracy of a link latency unbalance between forward and reverse signalling in a link on which said node received said message, wherein the request is to a synchronization support node of said communication network and comprising information of at least one of an identity and a type of a model of said link;
    receiving, from said synchronization support node, data associated with said value of said accuracy of said link latency unbalance; and
    calculating a value of a total synchronization accuracy of said node comprising at least said accuracy of said link latency unbalance of said link.

2. The method according to claim 1 further comprising:
    retrieving a value of an internal synchronization accuracy of said node, wherein said calculating said value of said total synchronization accuracy comprises calculating said value of said total synchronization accuracy as a combination of at least said value of said accuracy of said link latency unbalance of said link and said value of said internal synchronization accuracy of said node.

3. The method according to claim 1 further comprising:
    transmitting, from said node to a downstream node in said communication network, a message comprising said value of said total synchronization accuracy of said node.

4. The method according to claim 1, wherein said node comprising a transparent clock and the method further comprising forwarding said message comprising said value of said synchronization accuracy of said first upstream node to a downstream node.

5. The method according to claim 1, wherein said node comprising a slave clock; and the method further comprising:
    receiving at least one message comprising a value of a transparent clock synchronization accuracy of at least one second upstream node in said communication network, said second upstream node being a node comprising a transparent clock,
    wherein the calculating said value of said total synchronization accuracy comprises calculating said value of said total synchronization accuracy as a further combination of said transparent clock synchronization accuracy.

6. The method according to claim 1 further comprising:
    obtaining a value of a link latency unbalance between forward and reverse signalling in said link.

7. The method according to claim 6, wherein said node comprising a transparent clock, and said method further comprising:
    transmitting, from said node to a downstream node, a message comprising at least one of a value of a total latency unbalance and said link latency unbalance between forward and reverse signalling in said link.

8. A method for synchronization of a slave clock in a node of a communication network, said method comprising:
    receiving, in said node, a message comprising a value of a synchronization accuracy of a first upstream node in said communication network;

transmitting a request for a value of an accuracy of a link latency unbalance between forward and reverse signalling in a link on which said node received said message, wherein the request is to a synchronization support node of said communication network and comprising information of at least one of an identity and a type of a model of said link;

receiving, from said synchronization support node, data associated with said value of said accuracy of said link latency unbalance;

calculating a value of a total synchronization accuracy of said node comprising at least said accuracy of said link latency unbalance of said link; and adjusting said slave clock of said node to compensate for a prevailing latency unbalance wherein said prevailing latency unbalance is one of a value of a total latency unbalance and a link latency unbalance between forward and reverse signalling in said link.

9. A node in a communication network, wherein the node is configured to receive a message comprising a value of a synchronization accuracy of a first upstream node, the node comprising;

a processor; and a memory comprising instructions which, when executed by the processor, cause the node to perform operations to:

transmit a request for a value of an accuracy of a link latency unbalance between forward and reverse signalling in a link on which said node received said message, wherein the request is to a synchronization support node of said communication network and comprising information of at least one of an identity and a type of a model of said link;

receive, from said synchronization support node, data associated with said value of said accuracy of said link latency unbalance; and calculate a value of a total synchronization accuracy of said node comprising at least said accuracy of said link latency unbalance of said link.

10. The node according to claim 9 further comprising communication circuitry configured to receive said message, transmit said request and receive said data.

11. The node according to claim 9, wherein said node is further configured to retrieve a value of an internal synchronization accuracy of said node, wherein said calculation of said value of said total synchronization accuracy comprises calculating said value of said total synchronization accuracy as a combination of at least said value of said accuracy of said link latency unbalance of said link and said value of said internal synchronization accuracy of said node.

12. The node according to claim 9, wherein said node is further configured to transmit to a downstream node in said communication network, a message comprising said value of said total synchronization accuracy of said node.

13. The node according to claim 9, wherein said node comprises a transparent clock, and wherein said node is further configured to forward said message comprising said value of said synchronization accuracy of said first upstream node to a downstream node.

14. The node according to claim 9, wherein said node comprises a slave clock, wherein said node is further configured to receive at least one message comprising a value of a transparent clock synchronization accuracy of at least one second upstream node in said communication network, said second upstream node being a node comprising a transparent clock, and wherein said node is further configured to perform said calculation of a value of a total synchronization accuracy by calculating said value of said total synchronization accuracy as a further combination of said transparent clock synchronization accuracy.

15. The node according to claim 9, wherein said node is further configured to obtain a value of a link latency unbalance between forward and reverse signalling in said link.

16. A non-transitory machine readable storage medium comprising instructions which, when executed by at least one processor of a node of a communication network, are capable of causing the node to perform operations comprising:

receiving a message comprising a value of a synchronization accuracy of a first upstream node in said communication network;

transmitting a request for a value of an accuracy of a link latency unbalance between forward and reverse signalling in a link on which said message was received, wherein the request is to a synchronization support node of said communication network and comprising information of at least one of an identity and a type of a model of said link;

receiving, from said synchronization support node, data associated with said value of said accuracy of said link latency unbalance; and calculating a value of a total synchronization accuracy comprising at least said accuracy of said link latency unbalance of said link.

* * * * *